United States Patent
Salehifar et al.

(10) Patent No.: US 12,244,861 B2
(45) Date of Patent: *Mar. 4, 2025

(54) IMAGE CODING METHOD ON BASIS OF TRANSFORMATION AND DEVICE THEREFOR

(71) Applicant: LG Electronics Inc., Seoul (KR)

(72) Inventors: Mehdi Salehifar, Seoul (KR); Seunghwan Kim, Seoul (KR); Moonmo Koo, Seoul (KR); Jaehyun Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/545,642

(22) Filed: Dec. 19, 2023

(65) Prior Publication Data

US 2024/0146965 A1     May 2, 2024

Related U.S. Application Data

(63) Continuation of application No. 18/097,625, filed on Jan. 17, 2023, now Pat. No. 11,895,334, which is a
(Continued)

(51) Int. Cl.
*H04N 19/00*     (2014.01)
*H04N 19/105*     (2014.01)
(Continued)

(52) U.S. Cl.
CPC ........... *H04N 19/60* (2014.11); *H04N 19/105* (2014.11); *H04N 19/124* (2014.11);
(Continued)

(58) Field of Classification Search
CPC .................................................... H04N 19/00
See application file for complete search history.

(56) References Cited

U.S. PATENT DOCUMENTS

| 5,448,053 A | 9/1995 | Rhoads |
| 8,423,597 B1 | 4/2013 | Ho et al. |

(Continued)

FOREIGN PATENT DOCUMENTS

| AU | 2013344305 | 3/2015 |
| CN | 101742328 | 6/2010 |

(Continued)

OTHER PUBLICATIONS

Notice of Allowance in Chinese Appln. No. 202210919980.X, mailed on Mar. 27, 2024, 14 pages (with English translation).
(Continued)

*Primary Examiner* — Maryam A Nasri
(74) *Attorney, Agent, or Firm* — Fish & Richardson P.C.

(57) ABSTRACT

An image decoding method performed by means of a decoding device according to the present invention comprises the steps of: deriving quantized transform coefficients with respect to a target block from a bitstream; performing inverse quantization with respect to the quantized transform coefficients with respect to the target block and deriving transform coefficients; deriving residual samples with respect to the target block on the basis of reduced inverse transform with respect to the transform coefficients; and generating a reconstructed picture on the basis of the residual samples with respect to the target block and prediction samples with respect to the target block. The reduced inverse transform is performed on the basis of a reduced inverse transform matrix. The reduced inverse transform matrix is a non-square matrix of which the number of columns is smaller than the number of rows.

7 Claims, 14 Drawing Sheets

Related U.S. Application Data continuation of application No. 17/507,446, filed on Oct. 21, 2021, now Pat. No. 11,601,679, which is a continuation of application No. 16/772,934, filed as application No. PCT/KR2018/015815 on Dec. 13, 2018, now Pat. No. 11,218,731.

(60) Provisional application No. 62/599,020, filed on Dec. 15, 2017.

(51) Int. Cl.
  *H04N 19/124* (2014.01)
  *H04N 19/176* (2014.01)
  *H04N 19/18* (2014.01)
  *H04N 19/60* (2014.01)
  *H04N 19/70* (2014.01)

(52) U.S. Cl.
  CPC ........... *H04N 19/176* (2014.11); *H04N 19/18* (2014.11); *H04N 19/70* (2014.11)

(56) References Cited

U.S. PATENT DOCUMENTS

| | | |
|---|---|---|
| 2006/0029157 A1 | 2/2006 | Dabak et al. |
| 2006/0291556 A1 | 12/2006 | Watanabe et al. |
| 2010/0086028 A1 | 4/2010 | Tanizawa et al. |
| 2012/0008682 A1 | 1/2012 | Karczewicz et al. |
| 2012/0082212 A1 | 4/2012 | Sadafale et al. |
| 2012/0177102 A1 | 7/2012 | Bjøntegaard et al. |
| 2012/0240001 A1 | 9/2012 | Abu-Surra et al. |
| 2012/0301040 A1 | 11/2012 | Yie et al. |
| 2013/0034153 A1 | 2/2013 | Song et al. |
| 2014/0010284 A1 | 1/2014 | Hong et al. |
| 2014/0140411 A1 | 5/2014 | Alshina et al. |
| 2014/0198848 A1 | 7/2014 | Yie et al. |
| 2014/0241424 A1 | 8/2014 | Oh et al. |
| 2014/0301450 A1 | 10/2014 | Alshina et al. |
| 2014/0301487 A1 | 10/2014 | Laroche et al. |
| 2014/0307782 A1 | 10/2014 | Shima |
| 2014/0341281 A1 | 11/2014 | Bossen et al. |
| 2015/0125061 A1 | 5/2015 | Holt |
| 2016/0014414 A1 | 1/2016 | Lin et al. |
| 2016/0227253 A1 | 8/2016 | Sato |
| 2016/0269730 A1 | 9/2016 | Jeon et al. |
| 2017/0064335 A1 | 3/2017 | Na et al. |
| 2017/0230677 A1* | 8/2017 | Wu ........................ H04N 19/44 |
| 2017/0238013 A1 | 8/2017 | Said et al. |
| 2017/0238014 A1 | 8/2017 | Said et al. |
| 2017/0280140 A1 | 9/2017 | Said et al. |

FOREIGN PATENT DOCUMENTS

| | | |
|---|---|---|
| CN | 102006478 | 4/2011 |
| CN | 102474272 | 5/2012 |
| CN | 102986221 | 3/2013 |
| CN | 103370939 | 10/2013 |
| CN | 103636205 | 3/2014 |
| CN | 103782600 A | 5/2014 |
| CN | 104378637 | 2/2015 |
| CN | 104378639 | 2/2015 |
| CN | 104885453 | 9/2015 |
| CN | 105120272 | 12/2015 |
| CN | 105516730 | 4/2016 |
| CN | 105791867 | 7/2016 |
| CN | 106254883 | 12/2016 |
| EP | 1746839 | 1/2007 |
| JP | 2008-118694 | 5/2008 |
| JP | 2011-003946 | 1/2011 |
| JP | 2012-138883 | 7/2012 |
| JP | 2015-139089 | 7/2015 |
| JP | 2016-105528 | 6/2016 |
| JP | 2017-041786 | 2/2017 |
| PT | 2591600 E | 1/2015 |
| WO | WO 2007/083312 | 7/2007 |
| WO | WO 2012/044075 A2 | 4/2012 |
| WO | WO 2017/061671 | 4/2017 |
| WO | WO 2017/093189 | 6/2017 |
| WO | WO 2017/191782 A1 | 11/2017 |

OTHER PUBLICATIONS

Notice of Allowance in Chinese Appln. No. 202210920509.2, mailed on Mar. 27, 2024, 14 pages (with English translation).
Office Action in Chinese Appln. No. 202210917423.4, mailed on Apr. 28, 2024, 22 pages (with English translation).
Notice of Allowance in Chinese Appln. No. 202210916508.0, mailed on Mar. 21, 2024, 16 pages (with English translation).
Notice of Allowance in Chinese Appln. No. 202210917423.4, mailed on Sep. 27, 2024, 4 pages.
Office Action in Russian Appln. No. 2024100251, mailed on Sep. 12, 2024, 58 pages.
Office Action in Indian Appln. No. 202218050044, mailed on Sep. 5, 2024, 7 pages.
Office Action in Brazilian Appln. No. 1220210249130, mailed on Nov. 26, 2024, 8 pages.

* cited by examiner

FIG. 6
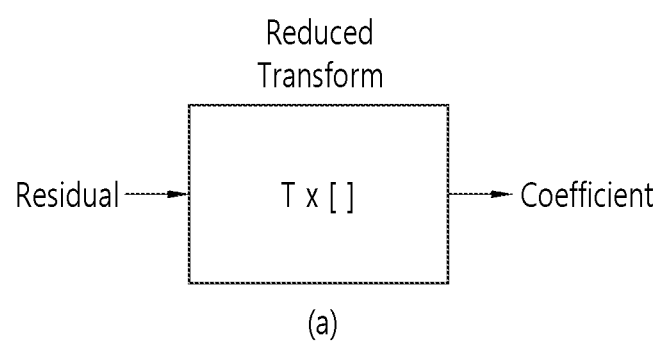
(a)
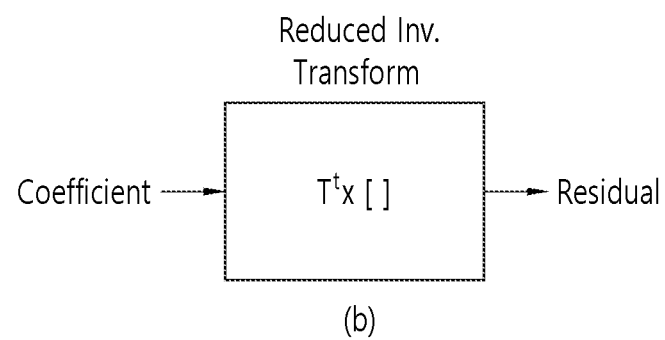
(b)

FIG. 11
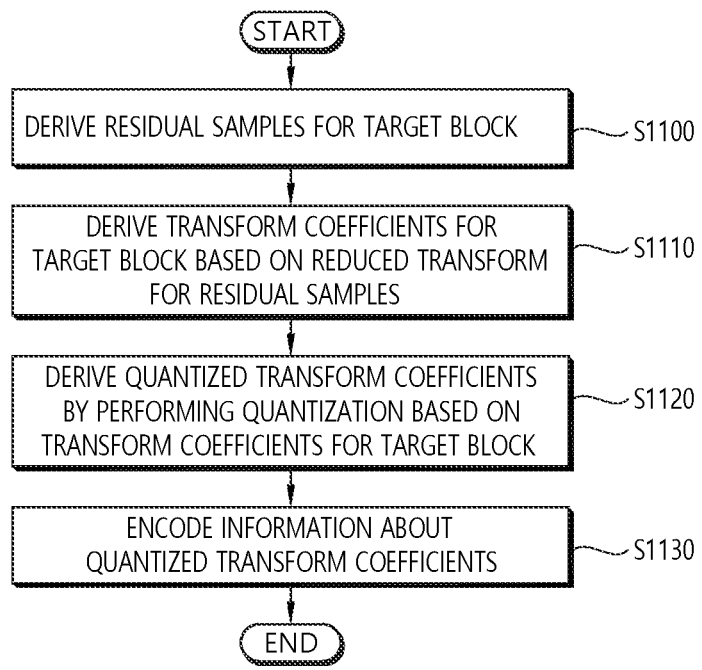
(a)
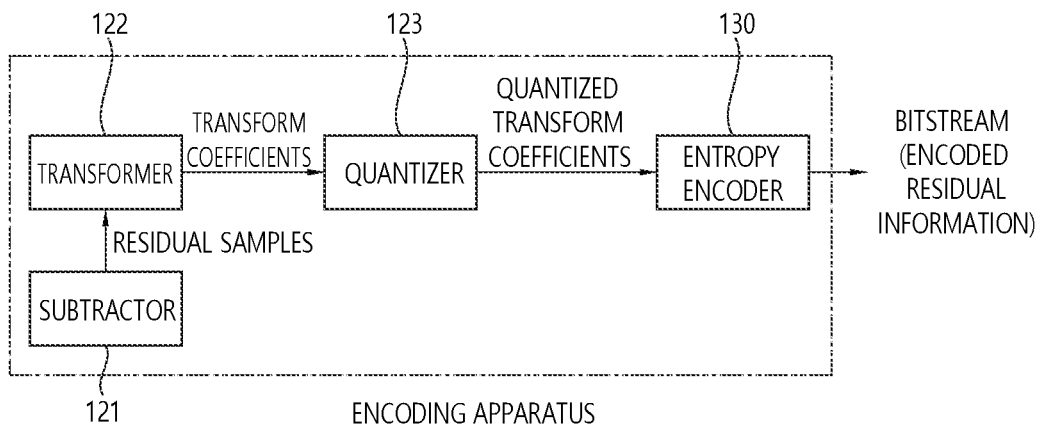
(b)

FIG. 12
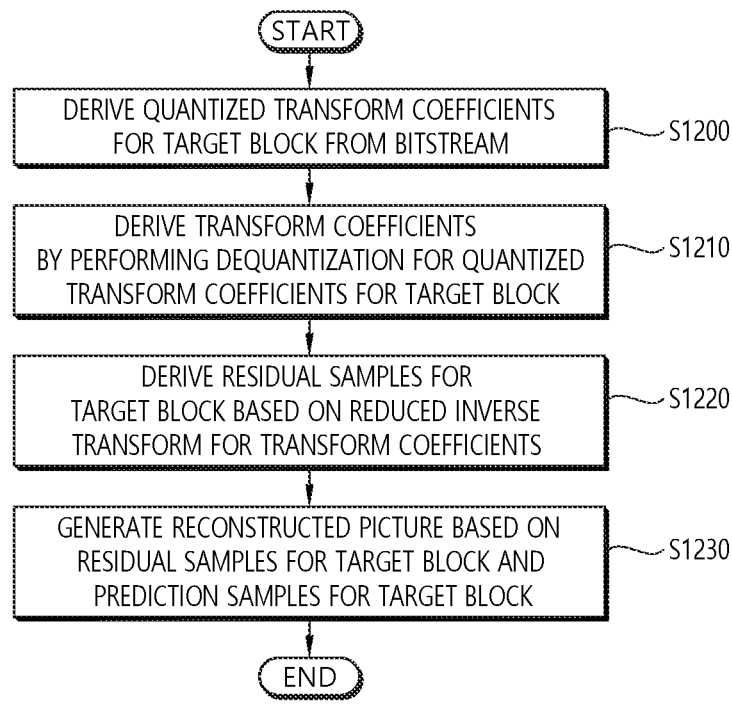
(a)
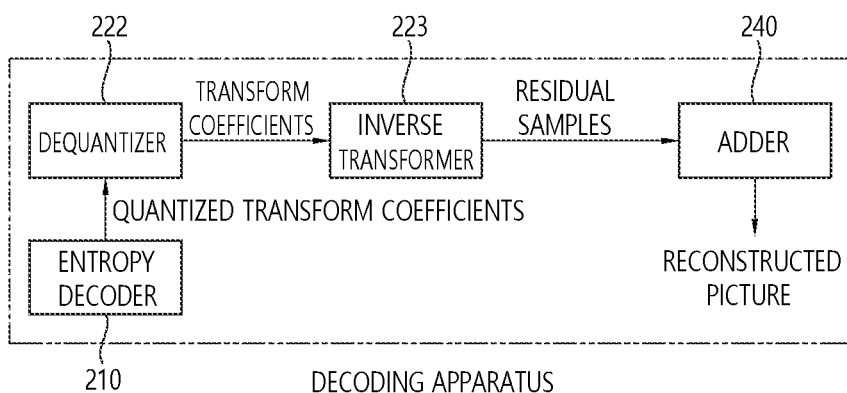
(b)

IMAGE CODING METHOD ON BASIS OF TRANSFORMATION AND DEVICE THEREFOR

CROSS-REFERENCE TO RELATED APPLICATIONS

This application is a continuation of U.S. application Ser. No. 18/097,625, filed on Jan. 17, 2023, which is a continuation of U.S. application Ser. No. 17/507,446, filed on Oct. 21, 2021, now U.S. Pat. No. 11,601,679, which is a continuation of U.S. application Ser. No. 16/772,934, filed on Jun. 15, 2020, now U.S. Pat. No. 11,218,731, which is a National Stage application under 35 U.S.C. § 371 of International Application No. PCT/KR2018/015815, filed on Dec. 13, 2018, which claims the benefit of U.S. Provisional Application No. 62/599,020, filed on Dec. 15, 2017. The disclosures of the prior applications are incorporated by reference in their entirety.

BACKGROUND OF THE DISCLOSURE

Field of the Disclosure

The present disclosure relates to an image coding technology, and more particularly, to an image coding method and apparatus based on transform of an image coding system.

Related Art

Demands for high-resolution and high-quality images, such as HD (High Definition) images and UHD (Ultra High Definition) images, are increasing in various fields. As image data has high resolution and high quality, the amount of information or bits to be transmitted increases relative to legacy image data. Accordingly, when image data is transmitted using a medium, such as a conventional wired/wireless broadband line, or image data is stored using an existing storage medium, a transmission cost and a storage cost thereof are increased.

Accordingly, there is a need for a highly efficient image compression technique for effectively transmitting, storing, and reproducing information of high resolution and high quality images.

SUMMARY

An object of the present disclosure is to provide a method and an apparatus for enhancing image coding efficiency.

Another object of the present disclosure is to provide a method and an apparatus for enhancing transform efficiency.

Still another object of the present disclosure is to provide a method and an apparatus for enhancing efficiency of a residual coding through a transform.

Yet another object of the present disclosure is to provide an image coding method and apparatus based on a reduced transform.

An exemplary embodiment of the present disclosure provides an image decoding method performed by a decoding apparatus. The method includes: deriving quantized transform coefficients for a target block from a bitstream, deriving transform coefficients by performing dequantization for the quantized transform coefficients for the target block, deriving residual samples for the target block based on reduced inverse transform for the transform coefficients, and generating a reconstructed picture based on the residual samples for the target block and prediction samples for the target block, and the reduced inverse transform is performed based on a reduced inverse transform matrix, and the reduced inverse transform matrix is a non-square matrix, a number of columns of the non-square matrix being less than a number of rows of the non-square matrix.

Another exemplary embodiment of the present disclosure provides an image encoding method performed by an encoding apparatus. The method includes: deriving residual samples for a target block, deriving transform coefficients for the target block based on reduced transform for the residual samples, deriving quantized transform coefficients by performing quantization based on the transform coefficients for the target block, and encoding information about the quantized transform coefficients, and the reduced transform is performed based on a reduced transform matrix, and the reduced transform matrix is a non-square matrix, the number of rows of the non-square matrix being less than the number of columns of the non-square matrix.

Still another exemplary embodiment of the present disclosure provides a decoding apparatus for performing an image decoding. The decoding apparatus includes: an entropy decoder which derives quantized transform coefficients for a target block from a bitstream, a dequantizer which derives transform coefficients by performing dequantization for the quantized transform coefficients for the target block, an inverse transformer which derives residual samples for the target block based on reduced inverse transform for the transform coefficients, and an adder which generates a reconstructed picture based on the residual samples for the target block and prediction samples for the target block, and the reduced inverse transform is performed based on a reduced inverse transform matrix, and the reduced inverse transform matrix is a non-square matrix, the number of rows of the non-square matrix being less than the number of columns of the non-square matrix.

Yet another exemplary embodiment of the present disclosure provides an encoding apparatus for performing an image encoding. The encoding apparatus includes: a subtractor which derives residual samples for a target block, a transformer which derives transform coefficients for the target block based on reduced transform for the residual samples, a quantizer which derives quantized transform coefficients by performing quantization based on the transform coefficients for the target block, and an entropy encoder which encodes information about the quantized transform coefficients, and the reduced transform is performed by a reduced transform matrix, and the reduced transform matrix is a non-square matrix, the number of rows of the non-square matrix being less than the number of columns of the non-square matrix.

According to the present disclosure, it is possible to enhance the overall image/video compression efficiency.

According to the present disclosure, it is possible to decrease the amount of data to be transmitted for the residual processing through the efficient transform, and to enhance the residual coding efficiency.

According to the present disclosure, it is possible to concentrate the non-zero transform coefficients on the low frequency component through the secondary transform in the frequency domain.

According to the present disclosure, it is possible to perform image coding based on the reduced transform, thereby enhancing the image coding efficiency.

BRIEF DESCRIPTION OF THE DRAWINGS

FIG. 6 is a diagram for explaining a reduced transform according to an exemplary embodiment of the present disclosure.

FIG. 11 is a flowchart illustrating an operation of a video encoding apparatus according to an exemplary embodiment of the present disclosure.

FIG. 12 is a flowchart illustrating an operation of a video decoding apparatus according to an exemplary embodiment of the present disclosure.

DESCRIPTION OF EXEMPLARY EMBODIMENTS

Figure 1:
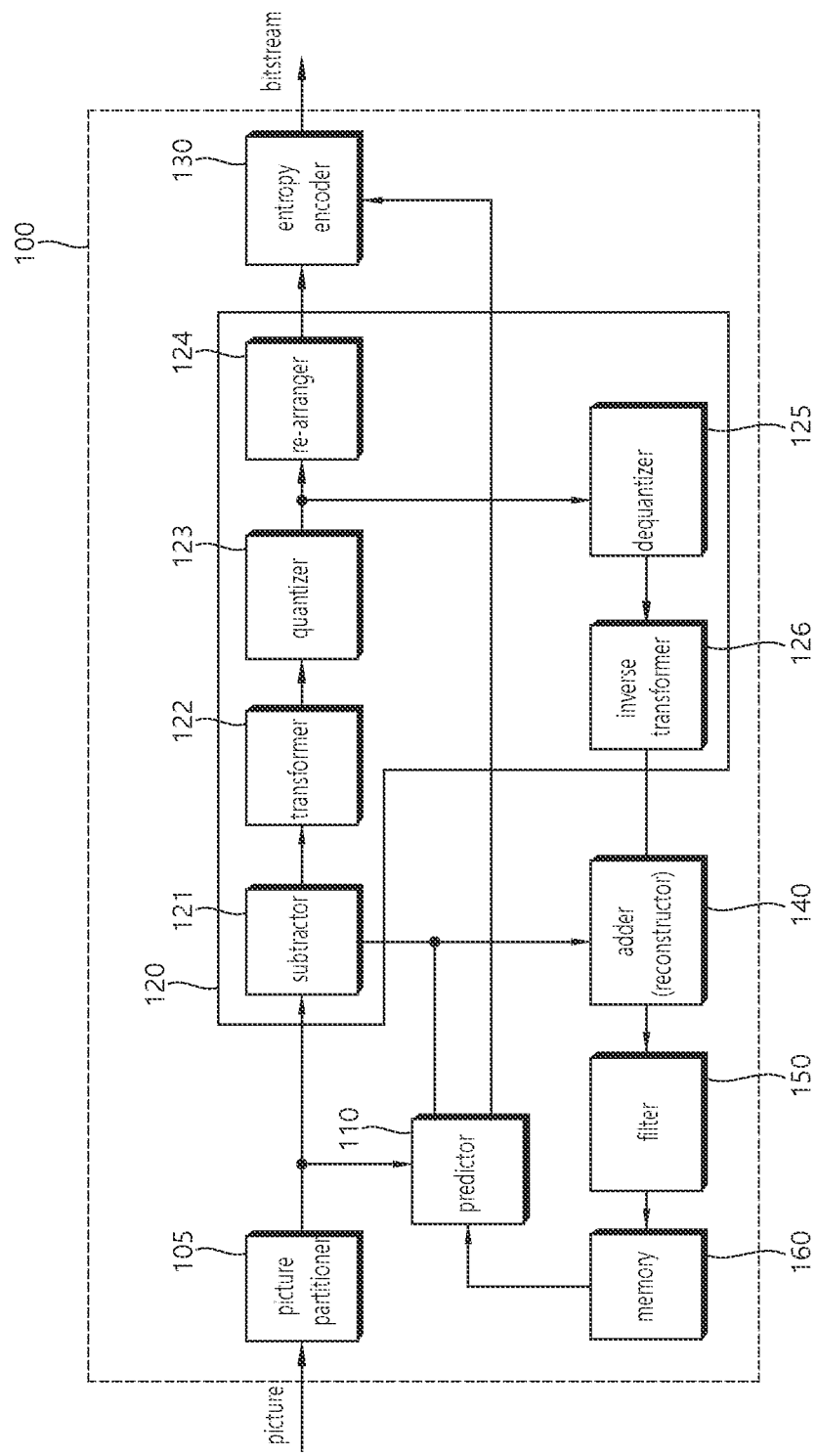
FIG. 1 is a schematic diagram illustrating a configuration of a video/image encoding device to which the present disclosure is applicable.

The present disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the disclosure without departing from the concept of the disclosure.

The following description may be applied in the technical field which deals with videos, images, or images. For example, a method or an exemplary embodiment disclosed in the following description may be associated with the disclosed contents of a Versatile Video Coding (VVC) standard (ITU-T Rec. H.266), a next-generation video/image coding standard after the VVC, or standards before the VVC (for example, a High Efficiency Video Coding (HEVC) standard (ITU-T Rec. H.265) or the like).

Hereinafter, examples of the present embodiment will be described in detail with reference to the accompanying drawings. In addition, like reference numerals are used to indicate like elements throughout the drawings, and the same descriptions on the like elements will be omitted.

In the present disclosure, a video may mean a set of a series of images according to a passage of time. Generally a picture means a unit representing an image at a specific time, a slice is a unit constituting a part of the picture. One picture may be composed of plural slices, and the terms of a picture and a slice may be mixed with each other as occasion demands.

A pixel or a pel may mean a minimum unit constituting one picture (or image). Further, a "sample" may be used as a term corresponding to a pixel. The sample may generally represent a pixel or a value of a pixel, may represent only a pixel (a pixel value) of a luma component, and may represent only a pixel (a pixel value) of a chroma component.

A unit indicates a basic unit of image processing. The unit may include at least one of a specific area and information about the area. Optionally, the unit may be mixed with terms such as a block, an area, or the like. In a typical case, an M×N block may represent a set of samples or transform coefficients arranged in M columns and N rows.

FIG. 1 briefly illustrates a structure of a video/image encoding apparatus to which the present disclosure is applicable. Hereinafter, an encoding apparatus may include a video encoding apparatus and/or an image encoding apparatus, and the video encoding apparatus may be used as a concept comprising the image encoding apparatus.

Referring to FIG. 1, a video encoding apparatus 100 may include a picture partitioner 105, a predictor 110, a residual processor 120, an entropy encoder 130, an adder 140, a filter 150, and a memory 160. The residual processor 120 may include a subtractor 121, a transformer 122, a quantizer 123, a re-arranger 124, a dequantizer 125, an inverse transformer 126.

The picture partitioner 105 may split an input picture into at least one processing unit.

In an example, the processing unit may be referred to as a coding unit (CU). In this case, the coding unit may be recursively split from the largest coding unit (LCU) according to a quad-tree binary-tree (QTBT) structure. For example, one coding unit may be split into a plurality of coding units of a deeper depth based on a quadtree structure, a binary tree structure and/or a ternary tree structure. In this case, for example, the quad tree structure may be first applied and the binary tree structure and ternary tree structure may be applied later. Alternatively, the binary tree structure/ternary tree structure may be applied first. The coding procedure according to the present embodiment may be performed based on a final coding unit which is not split any further. In this case, the largest coding unit may be used as the final coding unit based on coding efficiency, or the like, depending on image characteristics, or the coding unit may be recursively split into coding units of a lower depth as necessary and a coding unit having an optimal size may be used as the final coding unit. Here, the coding procedure may include a procedure such as prediction, transform, and reconstruction, which will be described later.

In another example, the processing unit may include a coding unit (CU) prediction unit (PU), or a transformer (TU). The coding unit may be split from the largest coding unit (LCU) into coding units of a deeper depth according to the quad tree structure. In this case, the largest coding unit may be directly used as the final coding unit based on the coding efficiency, or the like, depending on the image characteristics, or the coding unit may be recursively split into coding units of a deeper depth as necessary and a coding unit having an optimal size may be used as a final coding unit. When the smallest coding unit (SCU) is set, the coding unit may not be split into coding units less than the smallest coding unit. Here, the final coding unit refers to a coding unit which is partitioned or split to a prediction unit or a transformer. The prediction unit is a unit which is partitioned from a coding unit, and may be a unit of sample prediction. Here, the prediction unit may be divided into sub-blocks. The transformer may be divided from the coding unit according to the quad-tree structure and may be a unit for deriving a transform coefficient and/or a unit for deriving a residual signal from the transform coefficient. Hereinafter, the coding unit may be referred to as a coding block (CB), the prediction unit may be referred to as a prediction block (PB), and the transformer may be referred to as a transform block (TB). The prediction block or prediction unit may refer to a specific area in the form of a block in a picture and include an array of prediction samples. Also, the transform block or transformer may refer to a specific area in the form of a block in a picture and include the transform coefficient or an array of residual samples.

The predictor 110 may perform prediction on a processing target block (hereinafter, it may represent a current block or a residual block), and may generate a predicted block including prediction samples for the current block. A unit of prediction performed in the predictor 110 may be a coding block, or may be a transform block, or may be a prediction block.

The predictor 110 may determine whether intra-prediction is applied or inter-prediction is applied to the current block. For example, the predictor 110 may determine whether the intra-prediction or the inter-prediction is applied in unit of CU.

In case of the intra-prediction, the predictor 110 may derive a prediction sample for the current block based on a reference sample outside the current block in a picture to which the current block belongs (hereinafter, a current picture). In this case, the predictor 110 may derive the prediction sample based on an average or interpolation of neighboring reference samples of the current block (case (i)), or may derive the prediction sample based on a reference sample existing in a specific (prediction) direction as to a prediction sample among the neighboring reference samples of the current block (case (ii)). The case (i) may be called a non-directional mode or a non-angular mode, and the case (ii) may be called a directional mode or an angular mode. In the intra-prediction, prediction modes may include as an example 33 directional modes and at least two non-directional modes. The non-directional modes may include DC mode and planar mode. The predictor 110 may determine the prediction mode to be applied to the current block by using the prediction mode applied to the neighboring block.

In case of the inter-prediction, the predictor 110 may derive the prediction sample for the current block based on a sample specified by a motion vector on a reference picture. The predictor 110 may derive the prediction sample for the current block by applying any one of a skip mode, a merge mode, and a motion vector prediction (MVP) mode. In case of the skip mode and the merge mode, the predictor 110 may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor to derive a motion vector of the current block.

In case of the inter-prediction, the neighboring block may include a spatial neighboring block existing in the current picture and a temporal neighboring block existing in the reference picture. The reference picture including the temporal neighboring block may also be called a collocated picture (colPic). Motion information may include the motion vector and a reference picture index. Information such as prediction mode information and motion information may be (entropy) encoded, and then output as a form of a bit stream.

When motion information of a temporal neighboring block is used in the skip mode and the merge mode, a highest picture in a reference picture list may be used as a reference picture. Reference pictures included in the reference picture list may be aligned based on a picture order count (POC) difference between a current picture and a corresponding reference picture. A POC corresponds to a display order and may be discriminated from a coding order.

The subtractor 121 generates a residual sample which is a difference between an original sample and a prediction sample. If the skip mode is applied, the residual sample may not be generated as described above.

The transformer 122 transforms residual samples in units of a transform block to generate a transform coefficient. The transformer 122 may perform transform based on the size of a corresponding transform block and a prediction mode applied to a coding block or prediction block spatially overlapping with the transform block. For example, residual samples may be transformed using discrete sine transform (DST) transform kernel if intra-prediction is applied to the coding block or the prediction block overlapping with the transform block and the transform block is a 4×4 residual array and is transformed using discrete cosine transform (DCT) transform kernel in other cases.

The quantizer 123 may quantize the transform coefficients to generate quantized transform coefficients.

The re-arranger 124 rearranges quantized transform coefficients. The re-arranger 124 may rearrange the quantized transform coefficients in the form of a block into a one-dimensional vector through a coefficient scanning method. Although the re-arranger 124 is described as a separate component, the re-arranger 124 may be a part of the quantizer 123.

The entropy encoder 130 may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder 130 may perform encoding, according to an entropy encoding or according to a pred-configured method, together or separately on information (e.g., a syntax element value or the like) required for video reconstruction in addition to the quantized transform coefficients. The entropy-encoded information may be transmitted or stored in unit of a network abstraction layer (NAL) in a bit stream form. The bitstream may be transmitted via a network or be stored in a digital storage medium. Here, the network may include a broadcasting network or a communications network, the digital storage medium may include various storage medium such as USB, SD, CD, DVD, blue-ray, HDD, SDD and so on.

The dequantizer 125 dequantizes values (transform coefficients) quantized by the quantizer 123 and the inverse transformer 126 inversely transforms values dequantized by the dequantizer 125 to generate a residual sample.

The adder 140 adds a residual sample to a prediction sample to reconstruct a picture. The residual sample may be added to the prediction sample in units of a block to generate a reconstructed block. Although the adder 140 is described as a separate component, the adder 140 may be a part of the predictor 110. Meanwhile, the adder 140 may be referred to as a reconstructor or reconstructed block generator.

The filter 150 may apply deblocking filtering and/or a sample adaptive offset to the reconstructed picture. Artifacts at a block boundary in the reconstructed picture or distortion in quantization may be corrected through deblocking filtering and/or sample adaptive offset. Sample adaptive offset may be applied in units of a sample after deblocking filtering is completed. The filter 150 may apply an adaptive loop filter (ALF) to the reconstructed picture. The ALF may be applied to the reconstructed picture to which deblocking filtering and/or sample adaptive offset has been applied.

The memory 160 may store a reconstructed picture (decoded picture) or information necessary for encoding/decoding. Here, the reconstructed picture may be the reconstructed picture filtered by the filter 150. The stored reconstructed picture may be used as a reference picture for (inter) prediction of other pictures. For example, the memory 160 may store (reference) pictures used for inter-prediction. Here, pictures used for inter-prediction may be designated according to a reference picture set or a reference picture list.

Figure 2:
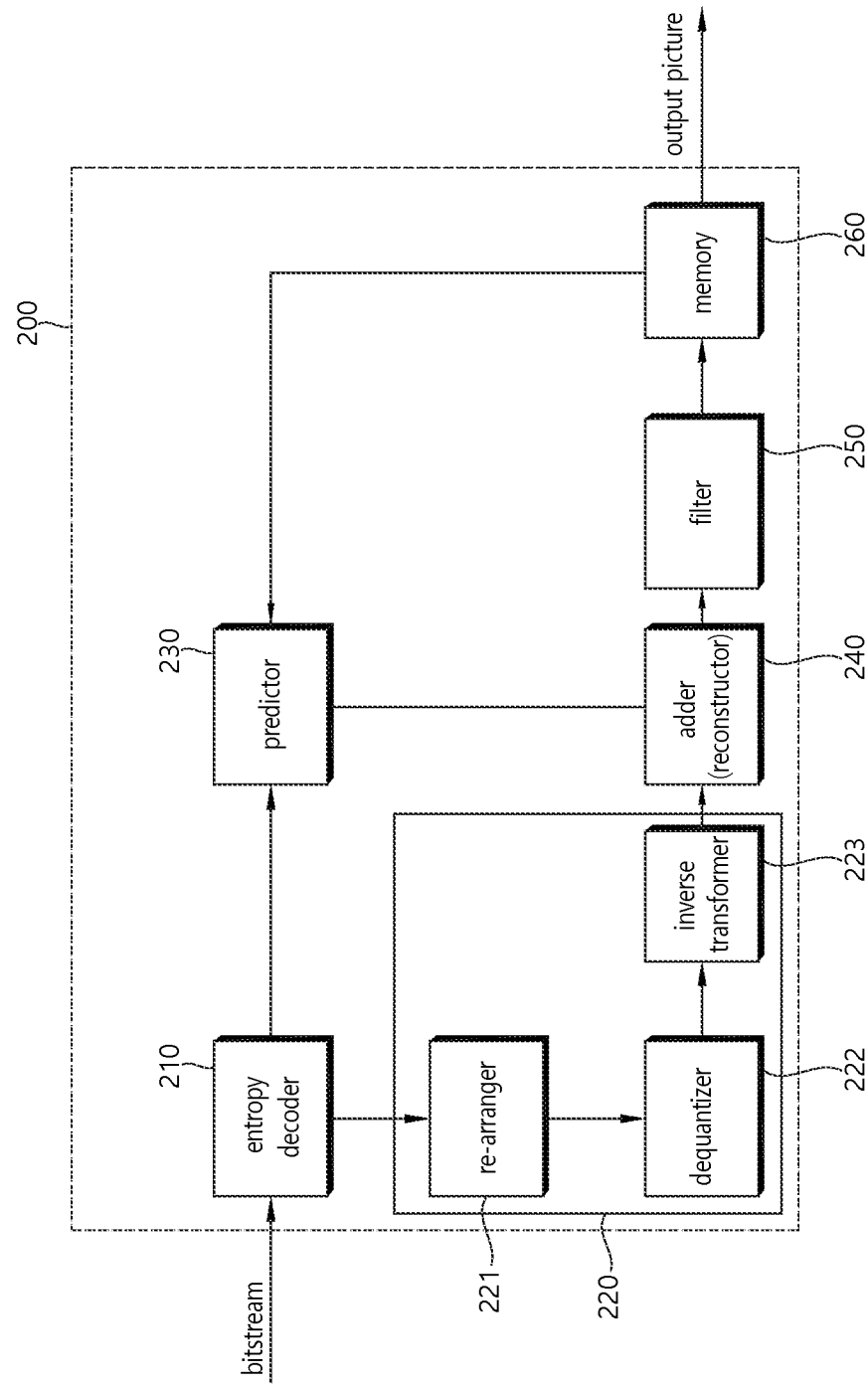
FIG. 2 is a schematic diagram illustrating a configuration of a video/image decoding device to which the present disclosure is applicable.

FIG. 2 briefly illustrates a structure of a video/image decoding apparatus to which the present disclosure is applicable. Hereinafter, a video decoding apparatus may include an image decoding apparatus.

Referring to FIG. 2, a video decoding apparatus 200 may include an entropy decoder 210, a residual processor 220, a predictor 230, an adder 240, a filter 250, and a memory 260. The residual processor 220 may include a re-arranger 221, a dequantizer 222, an inverse transformer 223.

Further, although it is not depicted, the video decoding apparatus 200 may include a receiver for receiving a bitstream including video information. The receiver may be configured as a separate module or may be included in the entropy decoder 210.

When a bit stream including video/image information is input, the video decoding apparatus 200 may reconstruct a video/image/picture in association with a process by which video information is processed in the video encoding apparatus.

For example, the video decoding apparatus 200 may perform video decoding using a processing unit applied in the video encoding apparatus. Thus, the processing unit block of video decoding may be, for example, a coding unit and, in another example, a coding unit, a prediction unit or a transformer. The coding unit may be split from the largest coding unit according to the quad tree structure and/or the binary tree structure and/or ternery tree structure.

A prediction unit and a transformer may be further used in some cases, and in this case, the prediction block is a block derived or partitioned from the coding unit and may be a unit of sample prediction. Here, the prediction unit may be divided into sub-blocks. The transformer may be split from the coding unit according to the quad tree structure and may be a unit that derives a transform coefficient or a unit that derives a residual signal from the transform coefficient.

The entropy decoder 210 may parse the bit stream to output information required for video reconstruction or picture reconstruction. For example, the entropy decoder 210 may decode information in the bit stream based on a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method may receive a bin corresponding to each syntax element in a bit stream, determine a context model using decoding target syntax element information and decoding information of neighboring and decoding target blocks or information of symbol/bin decoded in a previous step, predict bin generation probability according to the determined context model and perform arithmetic decoding of the bin to generate a symbol corresponding to each syntax element value. Here, the CABAC entropy decoding method may update the context model using information of a symbol/bin decoded for a context model of the next symbol/bin after determination of the context model.

Information about prediction among information decoded in the entropy decoder 210 may be provided to the predictor 250 and residual values, that is, quantized transform coefficients, on which entropy decoding has been performed by the entropy decoder 210 may be input to the re-arranger 221.

The re-arranger 221 may rearrange the quantized transform coefficients into a two-dimensional block form. The re-arranger 221 may perform rearrangement corresponding to coefficient scanning performed by the encoding apparatus. Although the re-arranger 221 is described as a separate component, the re-arranger 221 may be a part of the dequantizer 222.

The dequantizer 222 may de-quantize the quantized transform coefficients based on a (de)quantization parameter to output a transform coefficient. In this case, information for deriving a quantization parameter may be signaled from the encoding apparatus.

The inverse transformer 223 may inverse-transform the transform coefficients to derive residual samples.

The predictor 230 may perform prediction on a current block, and may generate a predicted block including prediction samples for the current block. A unit of prediction performed in the predictor 230 may be a coding block or may be a transform block or may be a prediction block.

The predictor 230 may determine whether to apply intra-prediction or inter-prediction based on information on a prediction. In this case, a unit for determining which one will be used between the intra-prediction and the inter-prediction may be different from a unit for generating a prediction sample. In addition, a unit for generating the prediction sample may also be different in the inter-prediction and the intra-prediction. For example, which one will be applied between the inter-prediction and the intra-prediction may be determined in unit of CU. Further, for example, in the inter-prediction, the prediction sample may be generated by determining the prediction mode in unit of PU, and in the intra-prediction, the prediction sample may be generated in unit of TU by determining the prediction mode in unit of PU.

In case of the intra-prediction, the predictor 230 may derive a prediction sample for a current block based on a neighboring reference sample in a current picture. The predictor 230 may derive the prediction sample for the current block by applying a directional mode or a non-directional mode based on the neighboring reference sample of the current block. In this case, a prediction mode to be applied to the current block may be determined by using an intra-prediction mode of a neighboring block.

In the case of inter-prediction, the predictor 230 may derive a prediction sample for a current block based on a sample specified in a reference picture according to a motion vector. The predictor 230 may derive the prediction sample for the current block using one of the skip mode, the merge mode and the MVP mode. Here, motion information required for inter-prediction of the current block provided by the video encoding apparatus, for example, a motion vector and information about a reference picture index may be acquired or derived based on the information about prediction.

In the skip mode and the merge mode, motion information of a neighboring block may be used as motion information of the current block. Here, the neighboring block may include a spatial neighboring block and a temporal neighboring block.

The predictor 230 may construct a merge candidate list using motion information of available neighboring blocks and use information indicated by a merge index on the merge candidate list as a motion vector of the current block. The merge index may be signaled by the encoding apparatus. Motion information may include a motion vector and a reference picture. In the skip mode and the merge mode, a firstly-ordered picture in the reference picture list may be used as a reference picture when motion information of a temporal neighboring block is used.

In the case of the skip mode, a difference (residual) between a prediction sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list may be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The aforementioned information about prediction may include a merge index indicating a candidate block having the best motion vector selected from candidate blocks included in the merge candidate list. Here, the predictor 230 may derive the motion vector of the current block using the merge index.

When the MVP (Motion vector Prediction) mode is applied as another example, a motion vector predictor candidate list may be generated using a motion vector of a reconstructed spatial neighboring block and/or a motion vector corresponding to a Col block which is a temporal neighboring block. That is, the motion vector of the reconstructed spatial neighboring block and/or the motion vector corresponding to the Col block which is the temporal neighboring block may be used as motion vector candidates. The aforementioned information about prediction may include a prediction motion vector index indicating the best motion vector selected from motion vector candidates included in the list. Here, the predictor 230 may select a prediction motion vector of the current block from the motion vector candidates included in the motion vector candidate list using the motion vector index. The predictor of the encoding apparatus may obtain a motion vector difference (MVD) between the motion vector of the current block and a motion vector predictor, encode the MVD and output the encoded MVD in the form of a bit stream. That is, the MVD may be obtained by subtracting the motion vector predictor from the motion vector of the current block. Here, the predictor 230 may acquire a motion vector included in the information about prediction and derive the motion vector of the current block by adding the motion vector difference to the motion vector predictor. In addition, the predictor may obtain or derive a reference picture index indicating a reference picture from the aforementioned information about prediction.

The adder 240 may add a residual sample to a prediction sample to reconstruct a current block or a current picture. The adder 240 may reconstruct the current picture by adding the residual sample to the prediction sample in units of a block. When the skip mode is applied, a residual is not transmitted and thus the prediction sample may become a reconstructed sample. Although the adder 240 is described as a separate component, the adder 240 may be a part of the predictor 230. Meanwhile, the adder 240 may be referred to as a reconstructor reconstructed block generator.

The filter 250 may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory 260 may store a reconstructed picture (decoded picture) or information necessary for decoding. Here, the reconstructed picture may be the reconstructed picture filtered by the filter 250. For example, the memory 260 may store pictures used for inter-prediction. Here, the pictures used for inter-prediction may be designated according to a reference picture set or a reference picture list. A reconstructed picture may be used as a reference picture for other pictures. The memory 260 may output reconstructed pictures in an output order.

Meanwhile, as described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain) The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization procedure. For example, the encoding apparatus may derive a residual block between the original block and the predicted block, perform a transform procedure on residual samples (residual sample array) included in the residual block to derive transform coefficients, perform a quantization procedure on the transform coefficients to derive quantized transform coefficients, and signal related residual information to the decoding apparatus (through a bit stream). Here, the residual information may include value information of the quantized transform coefficients, location information, a transform technique, a transform kernel, a quantization parameter, and the like. The decoding apparatus may perform dequantization/inverse transform procedure based on the residual information and derive residual samples (or residual blocks). The decoding apparatus may generate a reconstructed picture based on the predicted block and the residual block. Also, for reference for inter-prediction of a picture afterward, the encoding apparatus may also dequantize/inverse-transform the quantized transform coefficients to derive a residual block and generate a reconstructed picture based thereon.

Figure 3:
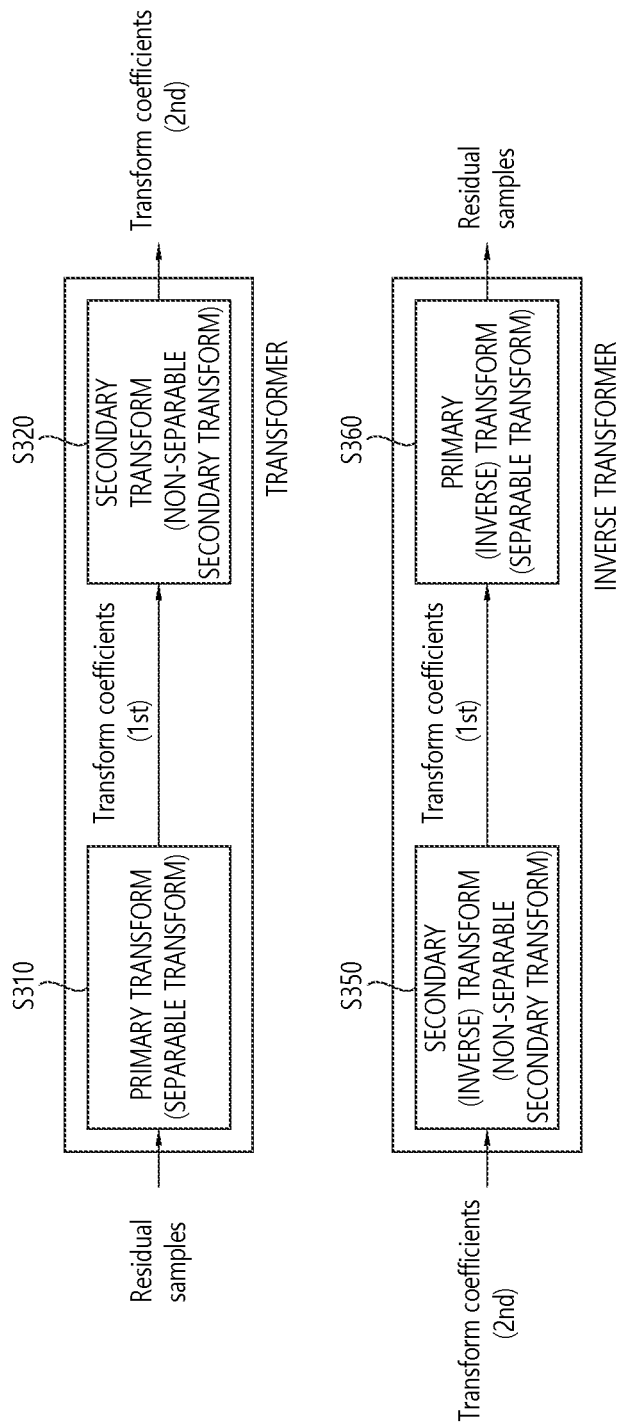
FIG. 3 is a schematic diagram illustrating a multiple transform technique according to an exemplary embodiment.

FIG. 3 schematically illustrates a multiple transform technique according to the present disclosure.

Referring to FIG. 3, a transformer may correspond to the transformer in the aforementioned encoding apparatus of FIG. 1, and an inverse transformer may correspond to the aforementioned inverse transformer in the encoding apparatus of FIG. 1 or the aforementioned inverse transformer in the decoding apparatus of FIG. 2.

The transformer may derive (primary) transform coefficients by performing a primary transform based on residual samples (residual sample array) in the residual block (S310). Here, the primary transform may include a multiple transform set (MTS). The multiple transform set may also be referred to as an adaptive multiple core transform in some cases.

The adaptive multiple core transform may represent a method for performing a transform additionally using a Discrete Cosine Transform (DCT) type 2, a Discrete Sine Transform (DST) type 7, a DCT type 8, and/or a DST type 1. That is, the multiple core transform may represent a transform method for transforming a residual signal (or a residual block) in the spatial domain into transform coefficients (or primary transform coefficients) in the frequency domain based on a plurality of transform kernels which are selected from the DCT type 2, the DST type 7, the DCT type 8, and the DST type 1. Here, the primary transform coefficients may be referred to as temporary transform coefficients from the viewpoint of the transformer.

That is, if the existing transform method is applied, the transform from the spatial domain to the frequency domain for the residual signal (or the residual block) may be applied based on the DCT type 2 to generate the transform coefficients. On the other hand, if the adaptive multiple core transform is applied, the transform from the spatial domain to the frequency domain for the residual signal (or the residual block) may be applied based on the DCT type 2, the DST type 7, the DCT type 8, and/or the DST type 1 or the like to generate the transform coefficients (or the primary transform coefficients). Here, the DCT type 2, the DST type 7, the DCT type 8, the DST type 1, and the like may be referred to as a transform type, a transform kernel, or a transform core.

For reference, the DCT/DST transform types may be defined based on basis functions, and the basis functions may be represented as shown in the following table.

TABLE 1

| Transform Type | Basis function $T_i(j)$, $i, j = 0, 1, \ldots, N - 1$ |
|---|---|
| DCT-II | $T_i(j) = \omega_0 \cdot \sqrt{\dfrac{2}{N}} \cdot \cos\left(\dfrac{\pi \cdot i \cdot (2j+1)}{2N}\right)$ where $\omega_0 = \begin{cases} \sqrt{\dfrac{2}{N}} & i = 0 \\ 1 & i \neq 0 \end{cases}$ |

TABLE 1-continued

| Transform Type | Basis function $T_i(j)$, $i, j = 0, 1, \ldots, N - 1$ |
|---|---|
| DCT-V | $T_i(j) = \omega_0 \cdot \omega_1 \cdot \sqrt{\dfrac{2}{2N-1}} \cdot \cos\left(\dfrac{2\pi \cdot i \cdot j}{2N-1}\right)$, where $\omega_0 = \begin{cases} \sqrt{\dfrac{2}{N}} & i = 0 \\ 1 & i \neq 0 \end{cases}$, $\omega_1 = \begin{cases} \sqrt{\dfrac{2}{N}} & j = 0 \\ 1 & j \neq 0 \end{cases}$ |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| DST-I | $T_i(j) = \sqrt{\dfrac{2}{N+1}} \cdot \sin\left(\dfrac{\pi \cdot (i+1) \cdot (j+1)}{N+1}\right)$ |
| DST-VII | $T_i(j) = \sqrt{\dfrac{4}{2N+1}} \cdot \sin\left(\dfrac{\pi \cdot (2i+1) \cdot (j+1)}{2N+1}\right)$ |

If the adaptive multiple core transform is performed, a vertical transform kernel and a horizontal transform kernel for a target block among the transform kernels may be selected, and a vertical transform for the target block may be performed based on the vertical transform kernel, and a horizontal transform for the target block may be performed based on the horizontal transform kernel. Here, the horizontal transform may represent a transform for horizontal components of the target block, and the vertical transform may represent a transform for vertical components of the target block. The vertical transform kernel/the horizontal transform kernel may be adaptively determined based on a prediction mode of the target block (CU or sub-block) which encompasses the residual block and/or a transform index indicating a transform subset.

The transformer may derive (secondary) transform coefficients by performing a secondary transform based on the (primary) transform coefficients (S320). If the primary transform is the transform from the spatial domain to the frequency domain, the secondary transform may be regarded as the transform from the frequency domain to the frequency domain. The secondary transform may include a non-separable transform. In this case, the secondary transform may be referred to as a non-separable secondary transform (NSST) or a mode-dependent non-separable secondary transform (MDNSST). The non-separable secondary transform may represent the transform which generates transform coefficients (or secondary transform coefficients) for the residual signal by secondarily transforming the (primary) transform coefficients derived through the primary transform based on a non-separable transform matrix. Here, the transform may be applied at once based on the non-separable transform matrix without separately applying the vertical transform and the horizontal transform (or without independently applying the horizontal and vertical transform) to the (primary) transform coefficients. That is, the non-separable secondary transform may represent the transform method which generates the transform coefficients (or the secondary transform coefficients) by transforming the vertical component and the horizontal component of the (primary) transform coefficients together without separating them based on the non-separable transform matrix. The non-separable secondary transform may be applied to a top-left area of a block composed of the (primary) transform coefficients (hereinafter, referred to as a transform coefficient block). For example, if both the width (W) and the height (H) of the transform coefficient block are 8 or more, an 8×8 non-separable secondary transform may be applied to the top-left 8×8 area of the transform coefficient block. In addition, if both the width (W) and the height (H) of the transform coefficient block are 4 or more and the width (W) or the height (H) of the transform coefficient block is less than 8, a 4×4 non-separable secondary transform may be applied to a top-left min (8, W)×min (8, H) area of the transform coefficient block. However, an exemplary embodiment is not limited thereto, and for example, if only a condition in which the width (W) or the height (H) of the transform coefficient block is less than 8 is satisfied, the 4×4 non-separable secondary transform may also be applied to the top-left min (8, W)×min (8, H) area of the transform coefficient block.

Specifically, for example, when a 4×4 input block is used, NSST may be performed as follows.

The 4×4 input block X may be represented as follows.

$$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix}$$ [Equation 1]

When X is expressed in a vector form, vector $\vec{X}$ may be represented as follows.

$$\vec{X} = [X_{00} X_{01} X_{02} X_{03} X_{10} X_{11} X_{12} X_{13} X_{20} X_{21} X_{22} X_{23} X_{30} X_{31} X_{32} X_{33}]^T$$ [Equation 2]

In this case, the NSST may be calculated as follows.

$$\vec{F} = T \cdot \vec{X}$$ [Equation 3]

Here, $\vec{F}$ denotes a transform coefficient vector and T denotes a 16×16 (non-separable) transform matrix.

A 16×1 transform coefficient vector $\vec{F}$ may be derived through Equation 3, and $\vec{F}$ may be re-organized as 4×4 blocks through a scan order (horizontal, vertical, diagonal, etc.). However, the above-described calculation is an example and hypercube-givens transform (HyGT) or the like may be used for calculation of secondary transform to reduce calculation complexity of the NSST.

Meanwhile, in the NSST, a transform kernel (or transform core, transform type) may be selected mode-dependently. Here, the mode may include an intra-prediction mode and/or an inter-prediction mode.

As described above, the NSST may be performed based on the 8×8 transform or the 4×4 transform determined based on the width (W) and height (H) of the transform coefficient block. That is, the NSST may be performed based on an 8×8 subblock size or a 4×4 subblock size. For example, in order to select the mode-based transform kernel, 35 sets of three NSST kernels may be configured for NSST for both 8×8 subblock size and 4×4 subblock size. That is, 35 transform sets may be configured for the 8×8 sub-block size, and 35 transform sets may be configured for the 4×4 sub-block size. In this case, the 35 transform sets for the 8×8 subblock size may include 3 8×8 transform kernels, respectively, and in this case, the 35 transform sets for the 4×4 subblock size may include 3 4×4 transform kernels. However, the size of the transform subblock, the number of sets, and the number of transform kernels in the set are an example and a size other than 8×8 or 4×4 may be used, or n sets may be configured and k transform kernels may be included in each set.

The transform set may also be referred to as a NSST set, and the transform kernel in the NSST set may be referred to as a NSST kernel. Selection of a specific one of the transform sets may be performed, for example, based on an intra prediction mode of a target block (CU or subblock).

For a reference, for example, the intra prediction mode may include two non-directional or non-angular intra prediction modes and 65 directional or angular intra-prediction modes. The non-directional intra prediction modes may include a planar intra prediction mode #0 and a DC intra prediction mode #1, and the directional intra prediction modes may include 65 intra prediction modes #2 to #66. However, this is an example and the present disclosure may also be applied even when the number of intra prediction modes is different. Meanwhile, the intra prediction mode #67 may be further used in some cases, and the intra prediction mode #67 may represent a linear model (LM) mode.

Figure 4:
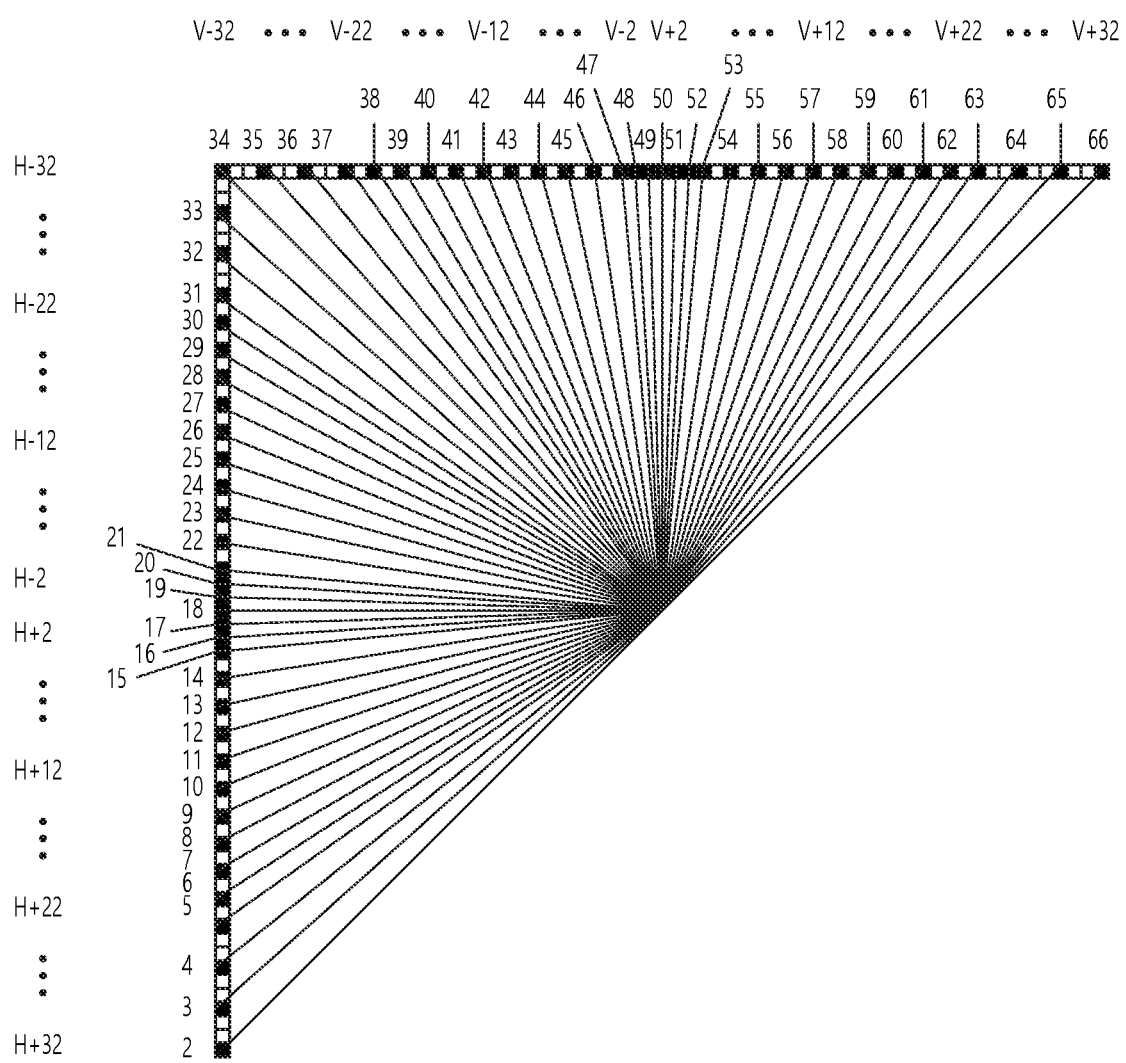
FIG. 4 is a diagram exemplarily illustrating 65 intra directional modes of the prediction directions.

FIG. 4 exemplarily shows intra directional modes of 65 prediction directions.

Referring to FIG. 4, intra prediction modes having horizontal directionality and intra prediction modes having vertical directionality may be divided based on the intra prediction mode #34 having a top-left diagonal prediction direction. H and V in FIG. 3 refer to horizontal directionality and vertical directionality, respectively, and the numbers −32 to 32 indicate displacement of 1/32 units on the sample grid position. The intra prediction modes #2 to #33 have horizontal directionality, and the intra prediction modes #34 to #66 have vertical directionality. The intra prediction mode #18 and the intra prediction mode #50 represent a horizontal intra prediction mode and a vertical intra prediction mode, respectively. The intra prediction mode #2 may be referred to as a bottom-left diagonal intra prediction mode, the intra prediction mode #34 may be referred to as a top-left diagonal intra prediction mode, and the intra prediction mode #66 may be referred to as a top-right diagonal intra prediction mode.

In this case, mapping between the 35 transform sets and the intra prediction modes may be represented, for example, as shown in the following table. For reference, when the LM mode is applied to a target block, the secondary transform may not be applied to the target block.

TABLE 2

| | intra mode | | | | | | | | | | | | | | | | |
|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 |
| set | 0 | 1 | 2 | 3 | 4 | 5 | 6 | 7 | 8 | 9 | 10 | 11 | 12 | 13 | 14 | 15 | 16 | 17 |

TABLE 2-continued

| | intra mode | | | | | | | | | | | | | | | |
|---|---|---|---|---|---|---|---|---|---|---|---|---|---|---|---|---|
| | 18 | 19 | 20 | 21 | 22 | 23 | 24 | 25 | 25 | 27 | 28 | 29 | 30 | 31 | 32 | 33 |
| set | 18 | 19 | 20 | 21 | 22 | 23 | 24 | 25 | 26 | 27 | 28 | 29 | 30 | 31 | 32 | 33 |
| | intra mode | | | | | | | | | | | | | | | | |
| | 34 | 35 | 36 | 37 | 38 | 39 | 40 | 41 | 42 | 43 | 44 | 45 | 46 | 47 | 48 | 49 | 50 51 |
| set | 34 | 33 | 32 | 31 | 30 | 29 | 28 | 27 | 26 | 25 | 24 | 23 | 22 | 21 | 20 | 19 | 18 17 |
| | intra mode | | | | | | | | | | | | | | | |
| | 52 | 53 | 54 | 55 | 56 | 57 | 58 | 59 | 60 | 61 | 62 | 63 | 64 | 65 | 66 | 67(LM) |
| set | 16 | 15 | 14 | 13 | 12 | 11 | 10 | 9 | 8 | 7 | 6 | 5 | 4 | 3 | 2 | NULL |

Meanwhile, when it is determined that a specific set is used, one of k transform kernels in the specific set may be selected through a NSST index. The encoding apparatus may derive a NSST index indicating a specific transform kernel based on a rate-distortion (RD) check and may signal the NSST index to the decoding apparatus. The decoding apparatus may select one of k transform kernels in the specific set based on the NSST index. For example, NSST index value 0 may indicate a first NSST kernel, NSST index value 1 may indicate a second NSST kernel, and NSST index value 2 may indicate the third NSST kernel. Alternatively, the NSST index value 0 may indicate that the first NSST is not applied to the target block, and the NSST index values 1 to 3 may indicate the three transform kernels.

Referring back to FIG. 3, the transformer may perform the NSST based on the selected transform kernels and obtain (secondary) transform coefficients. The transform coefficients may be derived as quantized transform coefficients through the quantizer as described above, and encoded and signaled to the decoding apparatus and delivered to the dequantizer/inverse-transformer in the encoding apparatus.

Meanwhile, when the secondary transform is omitted as described above, the (primary) transform coefficients, which are outputs of the primary (separable) transform, may be derived as quantized transform coefficients through the quantizer as described above and may be encoded and signaled to the decoding apparatus and delivered to the dequantizer/inverse-transformer in the encoding apparatus.

The inverse transformer may perform a series of procedures in a reverse order of the procedure performed by the transformer described above. The inverse transformer may receive (inverse-quantized) transform coefficients, perform secondary (inverse) transform to derive (primary) transform coefficients (S350), and perform primary (inverse) transform on the (primary) transform coefficients to acquire a residual block (residual samples). Here, the primary transform coefficients may be referred to as modified transform coefficients from the viewpoint of the inverse transformer. As described above, the encoding apparatus and the decoding apparatus may generate a reconstructed block based on the residual block and the predicted block and generate a reconstructed picture based on the reconstructed block.

Meanwhile, as described above, when the secondary (inverse) transform is omitted, the (dequantized) transform coefficients may be received and the primary (separable) transform may be performed thereon to acquire a residual block (residual samples). As described above, the encoding apparatus and the decoding apparatus may generate a reconstructed block based on the residual block and the predicted block and generate a reconstructed picture based on the reconstructed block.

Figure 5A:
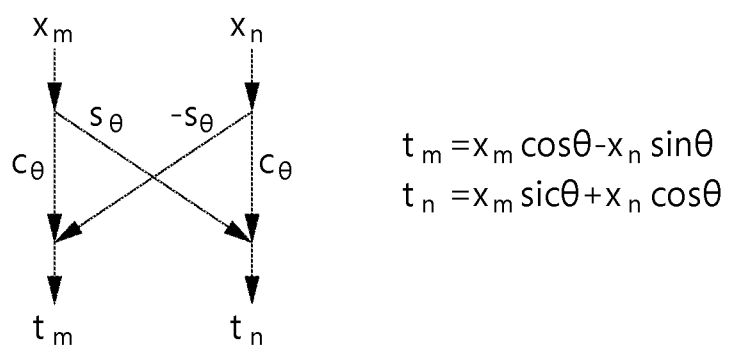
FIGS. 5A to 5C are flowcharts illustrating a non-separable secondary transform process according to an exemplary embodiment.
Figure 5B:
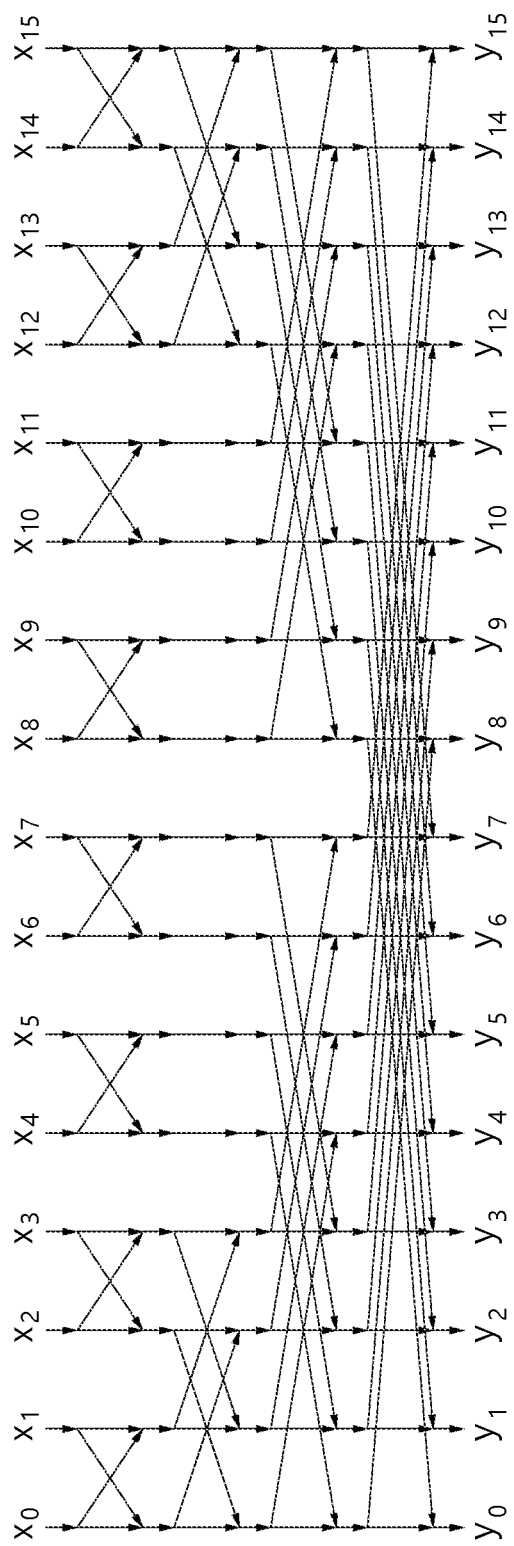
Figure 5C:
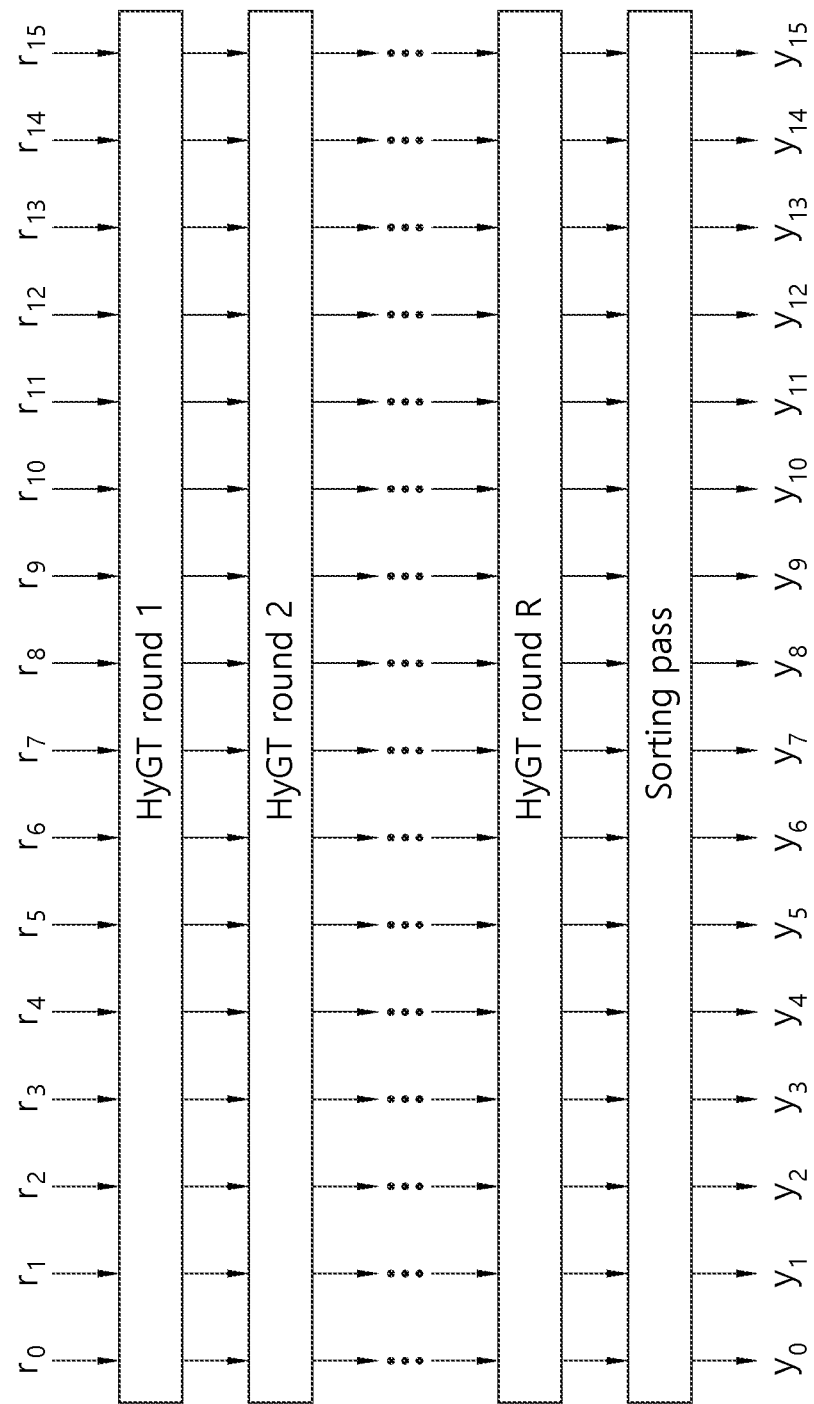

FIGS. 5A to 5C are diagrams for explaining reduced transform according to an exemplary embodiment of the present disclosure.

As described above in FIG. 3, in the non-separable secondary transform (hereinafter referred to as 'NSST'), block data of the transform coefficients obtained by applying the primary transform are divided into M×M blocks, and then a $M^2 \times M^2$ NSST may be performed for each M×M block. The M may be, for example, 4 or 8, but is not limited thereto.

The $M^2 \times M^2$ NSST may also be applied in the form of a matrix product, but the Hypercube-Givens Transform (HyGT) described above in FIG. 3 may be used to calculate the NSST in order to decrease a computational amount and a required memory capacity. The HyGT is an orthogonal transform, and the HyGT may include Givens rotation $G_{i,j}$ (m, n) defined by an orthogonal matrix G (m, n, θ) as a basic component. Givens rotation $G_{i,j}$ (m, n) may be expressed by Equation 4 below.

$$G_{i,j}(m, n) = \begin{cases} \cos\theta, & i = j = m \text{ or } i = 1 = n, \\ \sin\theta, & i = m, 1 = n, \\ -\sin\theta, & i = n, 1 = m, \\ 1, & i = 1 \text{ and } i \neq m \text{ and } i \neq n, \\ 0, & \text{otherwise.} \end{cases} \quad \text{[Equation 4]}$$

The Givens rotation based on Equation 4 may be illustrated in FIG. 5A. Referring to Equation 4 and FIG. 5A, it may be confirmed that one Givens rotation is described by only one angle (θ).

FIG. 5B illustrates an example of one round constituting a 16×16 NSST. More specifically, the HyGT may be performed by combining Givens rotations in a hypercube arrangement, and the flow of the HyGT for 16 elements may be illustrated in a butterfly form as illustrated in FIG. 5B. As illustrated in FIG. 5B, one round is composed of 4 Givens rotation layers, each Givens rotation layer is composed of 8 Givens rotations, and each Givens rotation may be formed in a structure which selects 2 input data like the connection configuration illustrated in FIG. 5B to apply a rotation transform and then outputs the rotation-transformed two input data at the corresponding selection locations as they are. The 16×16 NSST may apply two rounds and one-time permutation layer sequentially, and 16 data may be arbitrarily mixed through the corresponding permutation layer.

All of the two rounds may be connected as illustrated in FIG. 5B, but all of the Givens rotation layers for the two rounds may be different.

A 64×64 NSST is composed of Givens rotation layers with 64 inputs and outputs, and like the 16×16 NSST, at least one round may be applied, and one round may be composed of 6 Givens rotation layers which are connected in a method similar to that of FIG. 5B. As an example, the four rounds may be applied to 64×64 NSST, and then a permutation layer for randomly mixing 64 data may be applied. The Givens rotation layers for each of the four rounds may be different from each other.

FIG. 5B illustrates a round applied to a forward transform. When an inverse transform is applied, a backward permutation layer is first applied, and then corresponding Givens rotations may be applied along a direction from bottom to top in FIG. 5B in order from the last round to the first round. An angle corresponding to each Givens rotation of the backward NSST may be a value obtained by applying a—sign to the corresponding forward angle.

To enhance coding efficiency, one or more HyGT rounds may be used. As illustrated in FIG. 5C, the NSST may be composed of R HyGT rounds, and may additionally include a sorting pass. The sorting pass may also be interpreted as an optional permutation pass, and may sort the transform coefficients based on variance. As an example, two-round HyGT may be applied to the 16×16 NSST, and four-round HyGT may be applied to the 64×64 NSST.

FIG. 6 is a diagram for explaining reduced transform according to an exemplary embodiment of the present disclosure.

In the present specification, a "target block" may mean a current block or a residual block to be coded.

In the present specification, a "reduced transform" may mean a transform which is performed for residual samples for the target block based on a transform matrix whose size is reduced according to a reduced factor. If the reduced transform is performed, the computational amount required for transform may be decreased due to a decrease in the size of the transform matrix. That is, the reduced transform may be used to eliminate a computational complexity issue which occurs when a large block is transformed or non-separable transformed. The reduced transform may be referred to as a primary transform (or a core transform). The reduced transform may also be used for any type of transform such as the primary transform (for example, DCT, DST, and the like) and the secondary transform (for example, NSST).

The reduced transform may be referred to in various terms such as reduced transform, reduction transform, reduced transform, reduced secondary transform, reduction transform, simplified transform, simple transform, RTS, RST, or the like, and the names which may refer to the reduced transform are not limited to the listed examples.

In the reduced transform according to an exemplary embodiment, the reduced transform matrix may be determined by mapping an N dimensional vector to an R dimensional vector located in a different space, where R is less than N. The N may mean the square of the length of one side of the block to be transformed or the total number of transform coefficients corresponding to the block to be transformed, and the reduced factor may mean an R/N value. The reduced factor may be referred to in various terms such as a reduced factor, a reduction factor, a reduced factor, a reduction factor, a simplified factor, a simple factor, or the like. Meanwhile, the R may be referred to as a reduced coefficient, but in some cases, the reduced factor may also mean R. In addition, in some cases, the reduced factor may also mean an N/R value.

In an exemplary embodiment, the reduced factor or the reduced coefficient may be signaled through a bitstream, but the exemplary embodiment is not limited thereto. For example, a predetermined value for the reduced factor or the reduced coefficient may be stored in each of the encoding apparatus 100 and the decoding apparatus 200, in which case the reduced factor or the reduced coefficient may not be signaled separately.

The size of the reduced transform matrix according to an exemplary embodiment is R×N less than the size N×N of the normal transform matrix, and may be defined as expressed in Equation 5 below.

$$T_{RxN} = \begin{bmatrix} t_{11} & t_{12} & t_{13} & \cdots & t_{1N} \\ t_{21} & t_{22} & t_{23} & \cdots & t_{2N} \\ \vdots & & & \ddots & \vdots \\ t_{R1} & t_{R2} & t_{R3} & \cdots & t_{RN} \end{bmatrix} \quad \text{[Equation 5]}$$

The matrix (T) in the reduced transform block illustrated in (a) of FIG. 6 may mean the matrix ($T_{R \times N}$) of Equation 5. If the reduced transform matrix ($T_{R \times N}$) is multiplied by residual samples for the target block as illustrated in (a) of FIG. 6, transform coefficients for the target block may be derived.

In an exemplary embodiment, if the size of the block to be transformed is 8×8, R=16 (that is, R/N=16/64=¼), and the size of the target block is 64×64, the reduced transform according to (a) of FIG. 6 may be expressed by a matrix operation as in Equation 6 below.

$$\begin{bmatrix} t_{1,1} & t_{1,2} & t_{1,3} & \cdots & t_{1,64} \\ t_{2,1} & t_{2,2} & t_{2,3} & \cdots & t_{2,64} \\ \vdots & & & \ddots & \vdots \\ t_{16,1} & t_{16,2} & t_{16,3} & \cdots & t_{16,64} \end{bmatrix} \times \begin{bmatrix} r_1 \\ r_2 \\ \vdots \\ \vdots \\ r_{64} \end{bmatrix} \quad \text{[Equation 6]}$$

In Equation 6, $r_1$ to $r_{64}$ may represent the residual samples for the target block. As a result of the operation of Equation 6, transform coefficients ($c_i$) for the target block may be derived, and the derivation process of the $c_i$ may be shown in Equation 7.

$$\begin{array}{l} \text{for } i \text{ from 1 to } R: \\ \quad c_i = 0 \\ \quad \text{for } j \text{ from 1 to } N: \\ \quad \quad c_i \mathrel{+}= t_{i,j} * r_j \end{array} \quad \text{[Equation 7]}$$

As a result of the operation of Equation 7, transform coefficients ($c_1$ to $c_R$) for the target block may be derived. That is, if R=16, the transform coefficients ($c_1$ to $c_{16}$) for the target block may be derived. If a regular transform is applied instead of the reduced transform and the transform matrix of 64×64 (N×N) in size is multiplied by a matrix including the residual samples of 64×1 (N×1) in size, 64 (N) transform coefficients for the target block are derived, but since the reduced transform is applied, only 16 (R) transform coefficients for the target block are derived. The total number of transform coefficients for the target block is decreased from N to R and thus the amount of data transmitted by the encoding apparatus 100 to the decoding apparatus 200 may be decreased, thereby enhancing transmission efficiency between the encoding apparatus 100 and the decoding apparatus 200.

Reviewing the size of the transform matrix, the size of the regular transform matrix is 64×64 (N×N) but the size of the reduced transform matrix is decreased at 16×64 (R×N), such that the usage of the memory may be decreased at an R/N ratio when the reduced transform is performed as compared to when the regular transform is performed. In addition, the number of multiplication operations may be decreased at an R/N ratio when the reduced transform matrix is used as compared to the number of multiplication operations, N×N, when the regular transform matrix is used.

In an exemplary embodiment, the transform coefficients for the target block may be derived by transforming the residual samples for the target block by the transformer 122 of the encoding apparatus 100; the transform coefficients for the target block may be transferred to the inverse transformer of the decoding apparatus 200; and the inverse transformer 223 of the decoding apparatus 200 may inverse-transform the transform coefficients for the target block. The residual samples for the target block may be derived based on the inverse transform which is performed for the transform coefficients for the target block. That is, the detailed operations according to the (reduced) inverse transform are only in the opposite order to the detailed operations according to the (reduced) transform, and the detailed operations according to the (reduced) inverse transform and the detailed operations according to the (reduced) transform are substantially similar.

The size of the reduced inverse transform matrix $T_{N \times R}$ according to an exemplary embodiment is N×R less than the size of the regular inverse transform matrix N×N, and the reduced inverse transform matrix $T_{N \times R}$ has a transpose relationship with the reduced transform matrix $T_{R \times N}$ expressed in Equation 5.

The matrix $T^t$ in the Reduced Inv. Transform block illustrated in (b) of FIG. 6 may mean the reduced inverse transform matrix $T_{N \times R}$. If the transform coefficients for the target block is multiplied by the reduced inverse transform matrix $T_{N \times R}$ as illustrated in (b) of FIG. 6, the primary transform coefficients for the target block or the residual samples for the target block may be derived.

More specifically, if the reduced inverse transform is applied based on the secondary inverse transform, the primary transform coefficients for the target block may be derived when the transform coefficients is multiplied by the reduced inverse transform matrix $T_{N \times R}$. On the other hand, if the reduced inverse transform is applied based on the primary inverse transform, the residual samples for the target block may be derived when the transform coefficients for the target block is multiplied by the reduced inverse transform matrix $T_{N \times R}$.

In an exemplary embodiment, if the size of the block to be inversely-transformed is 8×8, R=16 (that is, R/N=16/64=¼), and the size of the target block is 64×64, the reduced inverse transform according to (b) of FIG. 6 may be expressed by a matrix operation as in Equation 8 below.

$$\begin{bmatrix} t_{1,1} & t_{2,1} & \cdots & t_{16,1} \\ t_{1,2} & t_{2,2} & \cdots & t_{16,1} \\ t_{1,2} & t_{2,3} & \cdots & t_{16,1} \\ \vdots & \vdots & & \vdots \\ \vdots & & \ddots & \vdots \\ t_{1,64} & t_{2,64} & \cdots & t_{16,64} \end{bmatrix} \times \begin{bmatrix} c_1 \\ c_{11} \\ \vdots \\ c_{16} \end{bmatrix}$$

[Equation 8]

In Equation 8, $c_1$ to $c_{16}$ may represent the transform coefficients for the target block. As a result of the operation of Equation 8, the $r_j$ representing the primary transform coefficients for the target block or the residual samples for the target block may be derived, and the derivation process of the $r_j$ may be shown in Equation 9.

$$\begin{aligned} &\text{for } i \text{ from 1 to } N: \\ &\quad r_j = 0 \\ &\text{for } j \text{ from 1 to } R: \\ &\quad r_j \mathrel{+}= t_{j,i} * c_i \end{aligned}$$

[Equation 9]

As a result of the operation of Equation 9, the $r_1$ to $r_N$ representing the primary transform coefficients for the target block or the residual samples for the target block may be derived. Reviewing the size of the inverse transform matrix, the size of the regular inverse transform matrix is 64×64 (N×N), but the size of the reduced inverse transform matrix is decreased at 64×16 (N×R), such that the usage of the memory may be decreased at an R/N ratio when the reduced inverse transform is performed as compared to when the regular inverse transform is performed. In addition, the number of multiplication operations may be decreased (N×R) to an R/N ratio when the reduced inverse transform matrix is used as compared to the number of multiplication operations N×N when the regular inverse transform matrix is used.

Figure 7:
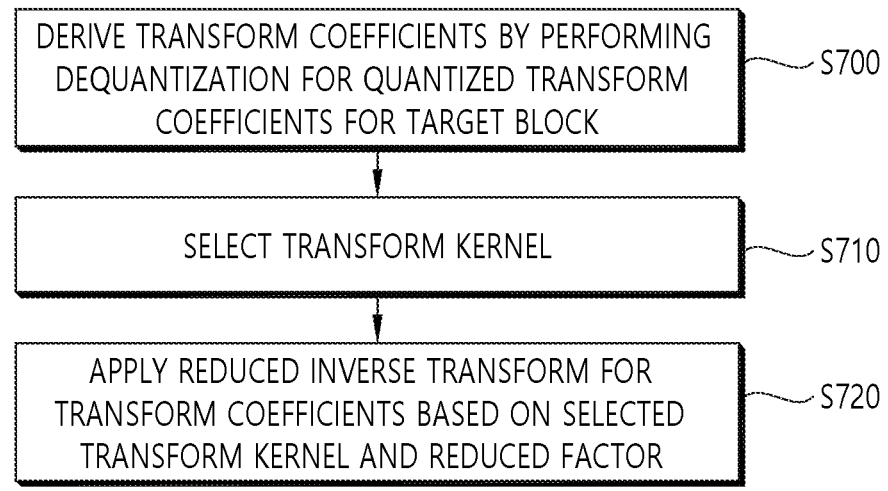
FIG. 7 is a flowchart illustrating a reduced transform process according to an exemplary embodiment of the present disclosure.

FIG. 7 is a flowchart illustrating a reduced transform process according to an exemplary embodiment of the present disclosure.

Each step illustrated in FIG. 7 may be performed by the decoding apparatus 200 illustrated in FIG. 2. More specifically, S700 may be performed by the dequantizer 222 illustrated in FIGS. 2, and S710 and S720 may be performed by the inverse transformer 223 illustrated in FIG. 2. Accordingly, detailed descriptions overlapping with the aforementioned contents in FIG. 2 will be omitted or simplified.

In an exemplary embodiment, as described above with reference to FIG. 6, the detailed operations according to the (reduced) transform are only in the opposite order to the detailed operations according to the (reduced) inverse transform, and the detailed operations according to the (reduced) transform and the detailed operations according to the (reduced) inverse transform may be substantially similar. Accordingly, those skilled in the art will readily understand that the descriptions of S700 to S720 for the reduced inverse transform described below may also be applied to the reduced transform in the same or similar manner.

The decoding apparatus 200 according to an exemplary embodiment may derive transform coefficients by performing dequantization for quantized transform coefficients for a target block (S700).

The decoding apparatus 200 according to an exemplary embodiment may select a transform kernel (S710). More specifically, the decoding apparatus 200 may select the transform kernel based on at least one of a transform index, a width and a height of an area to be transformed, an intra prediction mode used in image decoding, and information about a color component of the target block. However, the exemplary embodiment is not limited thereto, and for example, the transform kernel is predefined, and no separate information for selecting the transform kernel may be signaled.

In an example, the information about the color component of the target block may be signaled through CIdx. The CIdx may indicate 0 if the target block is a luma block, and the CIdx may indicate a non-zero value (for example, 1) if the target block is a chroma block, for example a $C_b$ block or a $C_r$ block.

The decoding apparatus 200 according to an exemplary embodiment may apply the reduced inverse transform to the transform coefficients based on the selected transform kernel and a reduced factor (S720).

Figure 8:
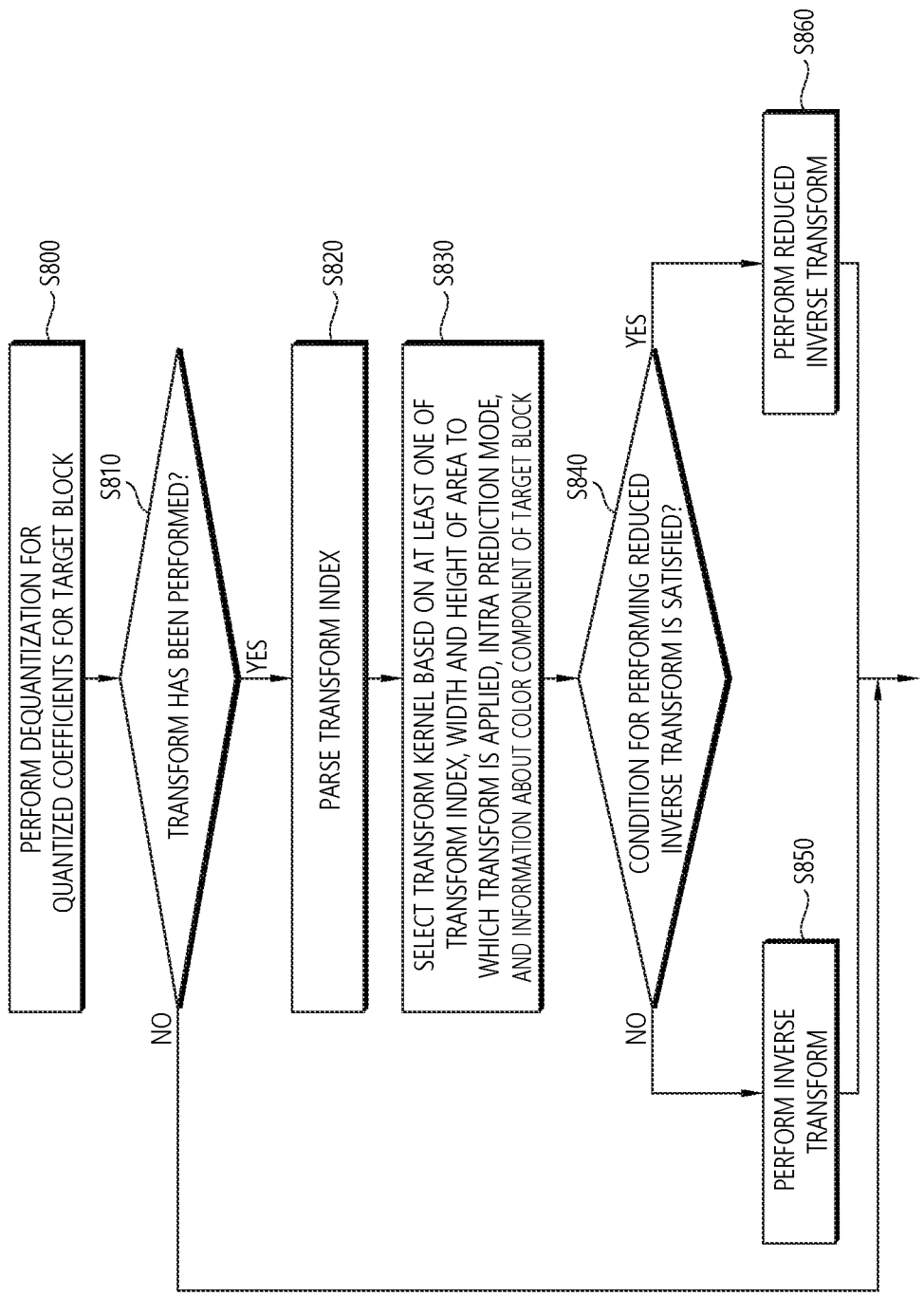
FIG. 8 is a flowchart illustrating a reduced transform process according to another exemplary embodiment of the present disclosure.

FIG. 8 is a flowchart illustrating a reduced transform process according to another exemplary embodiment of the present disclosure.

Each step illustrated in FIG. 8 may be performed by the decoding apparatus 200 illustrated in FIG. 2. More specifically, S800 may be performed by the dequantizer 222 illustrated in FIG. 2, and S810 to S860 may be performed by the inverse transformer 223 illustrated in FIG. 2. Accordingly, detailed descriptions overlapping with the aforementioned contents in FIG. 2 will be omitted or simplified.

In an exemplary embodiment, as described above with reference to FIG. 6, the detailed operations according to the (reduced) transform are only in the opposite order to the detailed operations according to the (reduced) inverse transform, and the detailed operations according to the (reduced) transform and the detained operations according to the (reduced) inverse transform may be substantially similar. Accordingly, those skilled in the art will readily understand that the descriptions of S800 to S860 for the reduced inverse transform described below may also be applied to the reduced transform in the same or similar manner.

The decoding apparatus 200 according to an exemplary embodiment may perform dequantization for quantized coefficients for the target block (S800). If the transform is performed in the encoding apparatus 100, the decoding apparatus 200 may derive the transform coefficients for the target block by dequantizing the quantized transform coefficients for the target block in the S800. Conversely, if the transform is not performed in the encoding apparatus 100, the decoding apparatus 200 may derive the residual samples for the target block by performing dequantization for the quantized residual samples for the target block in the S800.

The decoding apparatus 200 according to an exemplary embodiment may determine whether the transform has been performed for the residual samples for the target block in the encoding apparatus 100 (S810), and when it is determined that the transform has been performed, the decoding apparatus 200 may parse the transform index (or decoded from a bitstream) (S820). The transform index may include a horizontal transform index for horizontal transform and a vertical transform index for a vertical transform.

In an example, the transform index may include a primary transform index, a core transform index, an NSST index, and the like. The transform index may be expressed as Transform_idx, for example, and the NSST index may be expressed as NSST_idx, for example. In addition, the horizontal transform index may be expressed as Transform_idx_h, and the vertical transform index may be expressed as Transform_idx_v.

The decoding apparatus 200 according to an exemplary embodiment may omit operations according to S820 to S860, when it is determined in the S810 that the transform has not been performed for the residual samples for the target block in the encoding apparatus 100.

The decoding apparatus 200 according to an exemplary embodiment may select a transform kernel based on at least one a transform index, a width and a height of an area to which the transform is applied, an intra prediction mode used in image decoding, and information about a color component of the target block (S830).

The decoding apparatus 200 according to an exemplary embodiment may determine whether a condition for performing reduced inverse transform for the transform coefficients for the target block is satisfied (S840).

In an example, if the width and height of the area to which the reduced inverse transform is applied are each greater than a first coefficient, the decoding apparatus 200 may determine that the condition for performing the reduced inverse transform for the transform coefficients for the target block is satisfied.

In another example, if the product of the width and the height of the area to which the reduced inverse transform is applied is greater than a second coefficient, and a smaller one of the width and the height of the area to which the reduced inverse transform is applied is greater than a third coefficient, the decoding apparatus 200 may determine that the condition for performing the reduced inverse transform for the transform coefficients for the target block is satisfied.

In still another example, if the width and the height of the area to which the reduced inverse transform is applied are each less than or equal to a fourth coefficient, the decoding apparatus 200 may determine that the condition for performing the reduced inverse transform for the transform coefficients for the target block is satisfied.

In yet another example, if the product of the width and the height of the area to which the reduced inverse transform is applied is less than or equal to a fifth coefficient and a smaller one of the width and the height of the area to which the reduced inverse transform is applied is less than or equal to a sixth coefficient, the decoding apparatus 200 may determine that the condition for performing the reduced inverse transform for the transform coefficients for the target block is satisfied.

In still yet another example, if at least one of the condition in which the width and the height of the area to which the reduced inverse transform is applied are each greater than the first coefficient, the condition in which the product of the width and the height of the area to which the reduced inverse transform is applied is greater than the second coefficient and the smaller one of the width and the height of the area to which the reduced inverse transform is applied is greater than the third coefficient, the condition in which the width and the height of the area to which the reduced inverse transform is applied are each smaller than or equal to the fourth coefficient, and the condition in which the product of the width and the height of the area to which the reduced inverse transform is applied is less than or equal to the fifth coefficient and the smaller one of the width and the height of the area to which the reduced inverse transform is applied is smaller than or equal to the sixth coefficient is satisfied, the decoding apparatus 200 may determine that the condition in which the reduced inverse transform is performed for the transform coefficients for the target block is satisfied.

In the above examples, the first to sixth coefficients may be any predetermined positive integer. For example, the first to sixth coefficients may be 4, 8, 16 or 32.

The reduced inverse transform according to an exemplary embodiment may be applied to a square area which is included in the target block (that is, if the width and the height of the area to which the reduced inverse transform is applied are the same), and in some cases, the width and the height of the area to which the reduced inverse transform is applied may be fixed to values of the predetermined coefficients (for example, 4, 8, 16, 32, or the like). Meanwhile, the area to which the reduced inverse transform is applied is not limited to the square area, and the reduced inverse transform may be applied to a rectangular area or a non-rectangular area. A more detailed description of the area to which the reduced inverse transform is applied will be described later with reference to FIG. 10.

In an example, whether the condition for performing the reduced inverse transform is satisfied may be determined based on the transform index. That is, the transform index may indicate which transform has been performed for the target block.

The decoding apparatus 200 according to an exemplary embodiment may perform the (regular) inverse transform for the transform coefficients for the target block when it is determined in the S840 that the condition for performing the simplified inverse transform is not satisfied. As described above with reference to FIG. 3, the (inverse) transform may include, for example, a DCT2, a DCT4, a DCT5, a DCT7, a DCT8, a DST1, a DST4, a DST7, an NSST, a JEM-NSST (HyGT), or the like, but is not limited thereto.

The decoding apparatus 200 according to an exemplary embodiment may perform the reduced inverse transform for the transform coefficients for the target block when it is determined in the S840 that the condition for performing the reduced inverse transform is satisfied (S860).

Figure 9:
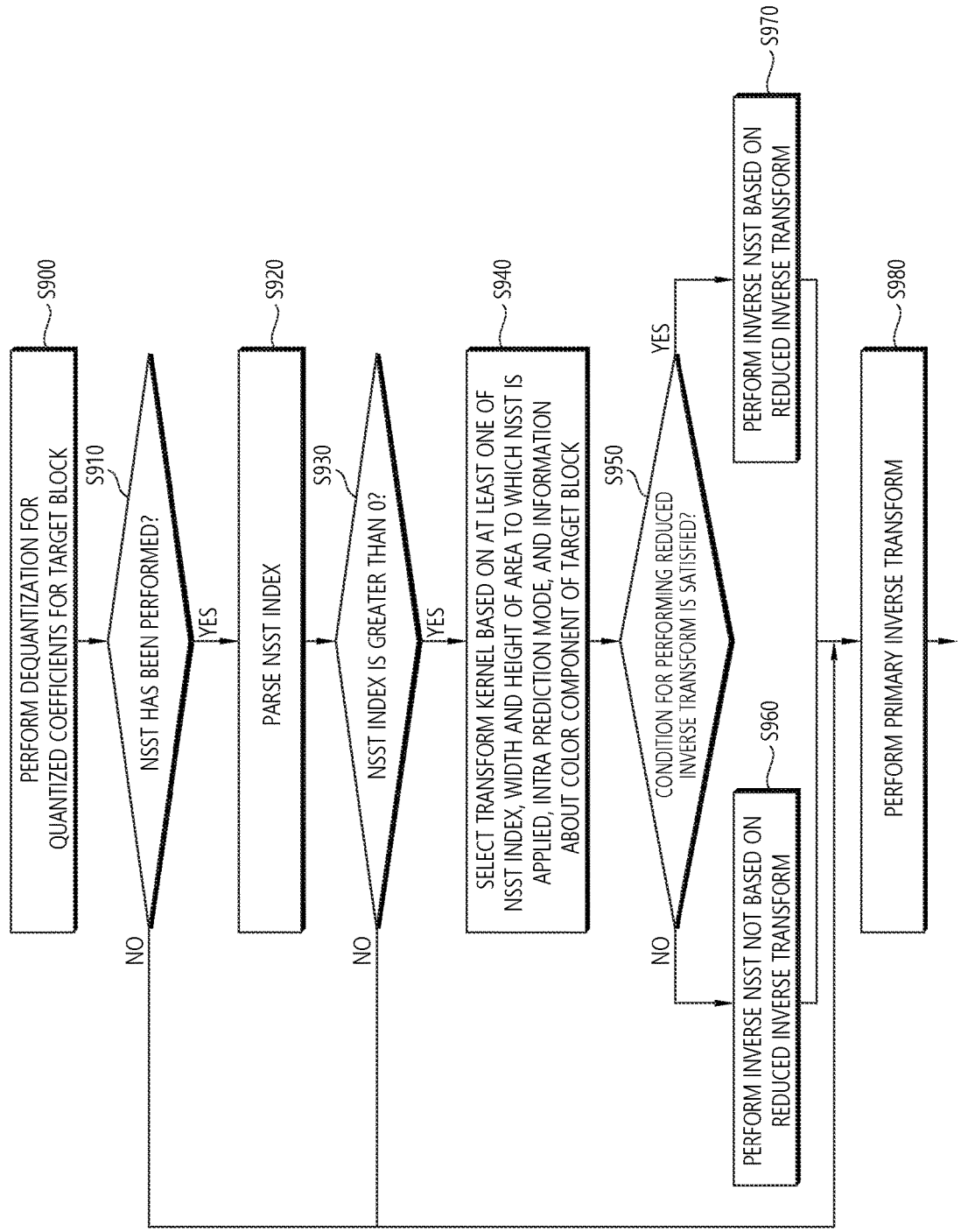
FIG. 9 is a flowchart illustrating a reduced transform process based on the non-separable secondary transform according to an exemplary embodiment of the present disclosure.

FIG. 9 is a flowchart illustrating a reduced transform process based on a non-separable secondary transform according to an exemplary embodiment of the present disclosure.

Each step illustrated in FIG. 9 may be performed by the decoding apparatus 200 illustrated in FIG. 2, and more specifically, S900 may be performed by the dequantizer 222 illustrated in FIG. 2, and S910 to S980 may be performed by the inverse transformer 223 illustrated in FIG. 2. In addition, S900 of FIG. 9 may correspond to the S800 of FIG. 8, S940 of FIG. 9 may correspond to the S830 of FIG. 8, and S950 of FIG. 9 may correspond to the S840 of FIG. 8. Accordingly, detailed descriptions overlapping with the contents described above with reference to FIGS. 2 and 8 will be omitted or simplified.

In an exemplary embodiment, as described above with reference to FIG. 6, the detailed operations according to the (reduced) transform are only in the opposite order to the detailed operations according to the (reduced) inverse transform, and the detailed operations according to the (reduced) transform and the detailed operations according to the (reduced) inverse transform may be substantially similar. Accordingly, those skilled in the art will readily understand that the descriptions of S900 to S980 for the reduced inverse transform described below may also be applied to the reduced transform in the same or similar manner.

The decoding apparatus 200 according to an exemplary embodiment may perform dequantization for the quantized coefficients for the target block (S900).

The decoding apparatus 200 according to an exemplary embodiment may determine whether the NSST has been performed for the residual samples for the target block in the encoding apparatus 100 (S910), and when it is determined that the NSST has been performed, the decoding apparatus 200 may parse the NSST index (or decoded from the bitstream) (S920).

The decoding apparatus 200 according to an exemplary embodiment may determine whether the NSST index is greater than 0 (S930), and when it is determined that the NSST index is greater than 0, the decoding apparatus 200 may select the transform kernel based on at least one the NSST index, a width and a height of an area to which the NSST index is applied, an intra prediction mode, and information about a color component of the target block (S940).

The decoding apparatus 200 according to an exemplary embodiment may determine whether the condition for performing the reduced inverse transform for the transform coefficients for the target block is satisfied (S950).

The decoding apparatus 200 according to an exemplary embodiment may perform the (regular) inverse transform not based on the reduced inverse transform for the transform coefficients for the target block, if it is determined in the S950 that the condition for performing the reduced inverse transform is not satisfied.

The decoding apparatus 200 according to an exemplary embodiment may perform an inverse NSST based on the reduced inverse transform for the transform coefficients for the target block, if it is determined in the S950 that the condition for performing the reduced inverse transform is satisfied.

The decoding apparatus 200 according to an exemplary embodiment may omit the operations according to S920 to S970 if it is determined in the S910 that the NSST has not been performed for the residual samples for the target block in the encoding apparatus 100.

The decoding apparatus 200 according to an exemplary embodiment may omit the operations according to S940 to S970, if it is determined in the S930 that the NSST index is not greater than 0.

The decoding apparatus 200 according to an exemplary embodiment may perform a primary inverse transform for primary transform coefficients for the target block derived by applying the inverse NSST. When the primary inverse transform is performed for the primary transform coefficients, the residual samples for the target block may be derived.

Figure 10:
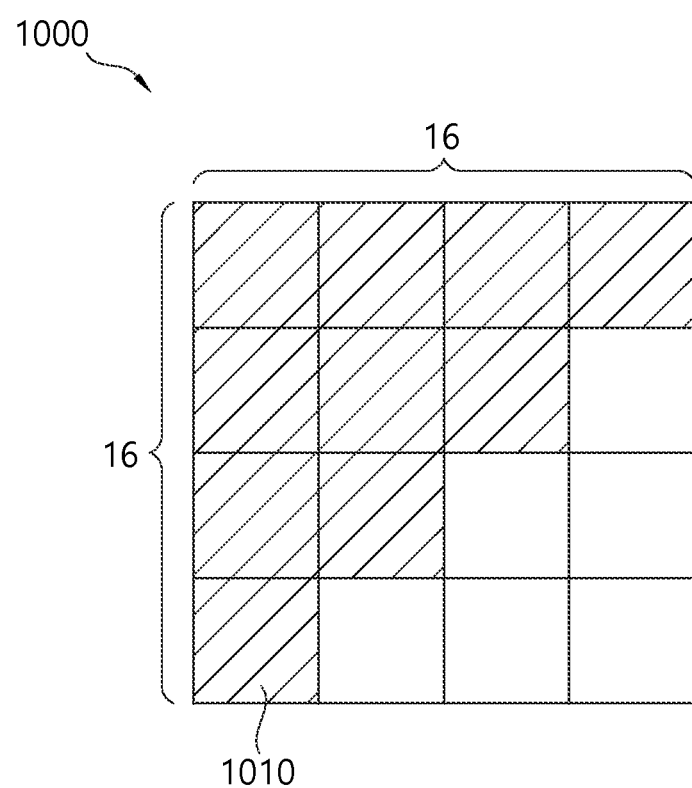
FIG. 10 is a diagram illustrating a block to which the reduced transform according to an exemplary embodiment of the present disclosure is applied.

FIG. 10 is a block diagram illustrating a block to which the reduced transform is applied according to an exemplary embodiment of the present disclosure.

As described above with reference to FIG. 8, the area to which the reduced (inverse) transform is applied in the target block is not limited to the square area, and the reduced transform may be applied to the rectangular area or the non-rectangular area.

FIG. 10 illustrates an example in which the reduced transform is applied to a non-rectangular area in a target block 1000 having a 16×16 in size. Ten blocks 1010 shaded in FIG. 10 represent areas in which the reduced transform is applied in the target block 1000. Since the sizes of the respective minimum unit blocks are 4×4, the reduced transform is applied to 10 4×4 pixels (that is, the reduced transform is applied to 160 pixels) according to the example of FIG. 10. When R=16, the size of the reduced transform matrix may be 16×160.

Meanwhile, those skilled in the art may readily understand that the arrangement of the minimum unit blocks 1010 included in the area to which the reduced transform illustrated in FIG. 10 is applied is only one of a large number of examples. For example, the minimum unit blocks included in the area to which the reduced transform is applied may not be adjacent to each other, or may have a relationship sharing only one vertex therebetween.

FIG. 11 is a flowchart illustrating an operation of a video encoding apparatus according to an exemplary embodiment of the present disclosure.

Each step illustrated in FIG. 11 may be performed by the encoding apparatus 100 illustrated in FIG. 1. More specifically, S1100 may be performed by the subtractor 121 illustrated in FIG. 1, S1110 may be performed by the transformer 122 illustrated in FIG. 1, S1120 may be performed by the quantizer 123 illustrated in FIG. 1, and S1130 may be performed by the entropy encoder 130 illustrated in FIG. 1. In addition, the operations according to S1100 to S1130 are based on some of the contents described above with reference to FIGS. 6 to 10. Accordingly, detailed descriptions overlapping with the contents described above with reference to FIGS. 1 and 6 to 10 will be omitted or simplified.

The encoding apparatus 100 according to an exemplary embodiment may derive the residual samples for the target block (S1100).

The encoding apparatus 100 according to an exemplary embodiment may derive transform coefficients for a target block based on the reduced transform for the residual samples (S1110). In an example, the reduced transform may be performed based on a reduced transform matrix, and the reduced transform matrix may be a non-square matrix in which the number of rows is less than the number of columns.

In an exemplary embodiment, the S1110 may include determining whether a condition for applying the reduced transform is satisfied, generating and encoding a transform index based on the determination, selecting a transform kernel, and applying the reduced transform to the residual samples based on the selected transform kernel and a reduced factor, when the condition for applying the reduced transform is satisfied. At this time, the size of the reduced transform matrix may be determined based on the reduced factor.

If the reduced transform according to the S1110 is based on a primary transform, primary transform coefficients for the target block may be derived when the reduced transform is performed for the residual samples for the target block. The decoding apparatus 200 may perform an NSST for the primary transform coefficients for the target block, and at this time, the NSST may be performed based on the reduced transform or performed not based on the reduced transform. When the NSST is performed based on the reduced transform, this may correspond to the operation according to the S1110.

The encoding apparatus 100 according to an exemplary embodiment may derive quantized transform coefficients by performing quantization based on the transform coefficients for the target block S1120.

The encoding apparatus 100 according to an exemplary embodiment may encode information about the quantized transform coefficients (S1130). More specifically, the encoding apparatus 100 may generate information about the quantized transform coefficients and encode information about the generated quantized transform coefficients. The information about the quantized transform coefficients may include residual information.

In an example, the information about the quantized transform coefficients may include at least one of information about whether the reduced transform is applied, information about the reduced factor, information about a minimum transform size to which the reduced transform is applied, and information about a maximum transform size to which the reduced transform is applied. A more detailed description of the information about the quantized transform coefficients will be described later in FIG. 12.

Referring to the S1110, it may be confirmed that the transform coefficients for the target block are derived based on the reduced transform for the residual samples. Reviewing the size of the transform matrix, the size of the regular transform matrix is N×N but the size of the reduced transform matrix is decreased at R×N, such that the usage of the memory may be decreased at an R/N ratio when the reduced transform is performed as compared to when the regular transform is performed. In addition, the number of multiplication operations may be decreased (R×N) to an R/N ratio when the reduced transform matrix is used as compared to the number of multiplication operations N×N when the regular transform matrix is used. In addition, since only the R transform coefficients are derived when the reduced transform is applied, the total number of transform coefficients for the target block is decreased from N to R as compared to a case where the N transform coefficients are derived when the regular transform is applied, such that the amount of data transmitted by the encoding apparatus 100 to the decoding apparatus 200 may be decreased. In summary, it is possible to enhance the transform efficiency and the coding efficiency of the encoding apparatus 100 through the reduced transform according to the S1110.

FIG. 12 is a flowchart illustrating an operation of a video decoding apparatus according to an exemplary embodiment of the present disclosure.

Each step illustrated in FIG. 12 may be performed by the decoding apparatus 200 illustrated in FIG. 2. More specifically, S1200 may be performed by the entropy decoder 210 illustrated in FIG. 2, S1210 may be performed by the dequantizer 222 illustrated in FIG. 2, S1220 may be performed by the inverse transformer 223 illustrated in FIG. 2, and S1230 may be performed by the adder 240 illustrated in FIG. 2. In addition, the operations according to S1200 to S1230 are based on some of the contents described above with reference to FIGS. 6 to 10. Accordingly, detailed descriptions overlapping with the contents described above with reference to FIGS. 2 and 6 to 10 will be omitted or simplified.

The decoding apparatus 200 according to an exemplary embodiment may derive quantized transform coefficients for the target block from the bitstream (S1200). More specifically, the decoding apparatus 200 may decode information about the quantized transform coefficients for the target block from the bitstream, and derive the quantized transform coefficients for the target block based on the information about the quantized transform coefficients for the target block. The information about the quantized transform coefficients for the target block may be included in a sequence parameter set (SPS) or a slice header, and may include at least one of information about whether the reduced transform is applied, information about the reduced factor, information about the minimum transform size to which the reduced transform is applied, information about the maximum transform size to which the reduced transform is applied, and information about the reduced inverse transform size.

More specifically, the information about whether the reduced transform is applied may be represented by an enabled flag, the information about the reduced factor may be represented by a reduced factor value, the information about the minimum transform size to which the reduced inverse transform is applied is represented by a minimum transform size value, the information about the maximum transform size to which the reduced inverse transform is applied may be represented by the maximum transform size value, and the information about the reduced inverse transform size may be represented by a size value of the reduced inverse transform. At this time, the enabled flag may be signaled through a first syntax element, the reduced factor value may be signaled through a second syntax element, the minimum transform size value may be signaled through a third syntax element, and the maximum transform size value may be signaled through a fourth syntax element, and the reduced inverse transform size value may be signaled through a fifth syntax element.

In an example, the first syntax element may be expressed as the syntax element Reduced_transform_enabled_flag. The syntax element Reduced_transform_enabled_flag may indicate 1 if the reduced transform is applied, and the syntax element Reduced_transform_enabled_flag may indicate 0 if the reduced transform is not applied. If the syntax element Reduced_transform_enabled_flag is not signaled, a value of the syntax element Reduced_transform_enabled_flag may be estimated to be 0.

In addition, the second syntax element may be expressed as a syntax element Reduced_transform_factor. The syntax element Reduced_transform_factor may indicate a value of R/N, where N may mean the square of the length of one side of the block to which the transform is applied or the total number of transform coefficients corresponding to the block to which the transform is applied. R may mean a reduced coefficient less than N. However, the example is not limited thereto, and for example, the Reduced_transform_factor may also indicate R rather than the R/N. Reviewing in view of the reduced inverse transform matrix, R means the number of columns of the reduced inverse transform matrix, and N means the number of rows of the reduced inverse transform matrix, and at this time, the number of columns of the reduced inverse transform matrix needs to be less than the number of rows. R may be, for example, 8, 16, 32, or the like, but is not limited thereto. If the syntax element Reduced_transform_factor is not signaled, the value of Reduced_transform_factor may be estimated as R/N (or R).

In addition, the third syntax element may be expressed as a syntax element min_reduced_transform_size. If the syntax element min_reduced_transform_size is not signaled, the value of min_reduced_transform_size may be estimated as 0.

In addition, the fourth syntax element may be expressed as a syntax element max_reduced_transform_size. If the syntax element max_reduced_transform_size is not signaled, a value of max_reduced_transform_size may be estimated as 0.

In addition, the fifth syntax element may be expressed as a syntax element reduced_transform_size. The size value of the reduced inverse transform included and signaled in the syntax element reduced_transform_size may indicate the size of the area to which the reduced inverse transform is applied or the size of the reduced transform matrix, but is not limited thereto. If the syntax element reduced_transform_size is not signaled, the value of reduced_transform_size may be estimated as 0.

Table 3 below shows an example in which the information about the quantized transform coefficients for the target block is included and signaled in the SPS.

TABLE 3

| seq_parameter_set_rbsp( ) { | Descriptor |
|---|---|
| sps_video_parameter_set_id | u(4) |
| sps_max_sub_layers_minus1 | u(3) |
| sps_temporal_id_nesting_flag | u(1) |
| profile_tier_level( sps_max_sub_layers_minus1 ) | |
| sps_seq_parameter_set_id | ue(v) |
| chroma_format_idc | ue(v) |
| if( chroma_format_idc == 3 ) | |
| separate_colour_plane_flag | u(1) |
| pic_width_in_luma_samples | ue(v) |

TABLE 3-continued

| seq_parameter_set_rbsp( ) { | Descriptor |
|---|---|
| pic_height_in_luma_samples | ue(v) |
| conformance_window_flag | u(1) |
| if( conformance_window_flag ) { | |
| conf_win_left_offset | ue(v) |
| conf_win_right_offset | ue(v) |
| conf_win_top_offset | ue(v) |
| conf_win_bottom_offset | ue(v) |
| } | |
| ... | |
| Reduced_transform_enabled_flag | u(1) |
| If(reduced_transform_enabled_flag) { | |
| reduced_transform_factor | ue(v) |
| min_reduced_transform_size | ue(v) |
| max_reduced_transform_size | ue(v) |
| reduced_transform_size | ue(v) |
| } | |
| sps_extension_flag | u(1) |
| if( sps_extension_flag ) | |
| while( more_rbsp_data( ) ) | |
| sps_extension_data_flag | u(1) |
| rbsp_trailing_bits( ) | |
| } | |

The decoding apparatus 200 according to an exemplary embodiment may derive transform coefficients by performing dequantization for the quantized transform coefficients for the target block (S1210).

The decoding apparatus 200 according to an exemplary embodiment may derive residual samples for the target block based on the reduced inverse transform for the transform coefficients (S1220). In an example, the reduced inverse transform may be performed based on the reduced inverse transform matrix, and the reduced inverse transform matrix may be a non-square matrix in which the number of columns is less than the number of rows.

In an exemplary embodiment, S1220 may include decoding a transform index, determining whether a condition for applying the reduced inverse transform is satisfied based on the transform index, selecting a transform kernel, and applying the reduced inverse transform for the transform coefficient based on the selected transform kernel and a reduced factor, when the condition for applying the reduced inverse transform is satisfied. At this time, the size of the reduced inverse transform matrix may be determined based on the reduced factor.

If the reduced inverse transform according to the S1220 is based on the inverse NSST, the primary transform coefficients for the target block may be derived when the reduced inverse transform is performed for the transform coefficients for the target block. The decoding apparatus 200 may perform the primary inverse transform for the primary transform coefficients for the target block, and at this time, the primary inverse transform may be performed based on the reduced inverse transform or performed not based on the reduced inverse transform.

Alternatively, when the reduced inverse transform according to the S1220 is based on the primary inverse transform, residual samples for the target block may be directly derived by performing the reduced inverse transform for the transform coefficients for the target block.

The decoding apparatus 200 according to an exemplary embodiment may generate a reconstructed picture based on the residual samples for the target block and prediction samples for the target block (S1230).

Referring to the S1220, it may be confirmed that residual samples for the target block are derived based on the reduced inverse transform for the transform coefficients for the target block. Reviewing the size of the inverse transform matrix, the size of the regular inverse transform matrix is N×N but the size of the reduced inverse transform matrix is reduced to N×R, such that the usage of the memory may be decreased at an R/N ratio when the reduced transform is performed as compared to when the regular transform is performed. In addition, the number of multiplication operations may be decreased (N×R) to an R/N ratio when the reduced inverse transform matrix is used as compared to the number of multiplication operations N×N when the regular inverse transform matrix is used. In addition, since only the R transform coefficients need to be decoded when the reduced inverse transform is applied, the total number of transform coefficients for the target block may be N to R when compared to a case where the N transform coefficients needs to be decoded when the regular inverse transform is applied, thereby enhancing decoding efficiency. In summary, it is possible to enhance the (inverse) transform efficiency and the coding efficiency of the decoding apparatus 200 through the reduced inverse transform according to the S1220.

The internal components of the aforementioned apparatus may be processors which execute consecutive processes stored in the memory, or may be hardware components composed of other hardware. These may be located inside/outside the apparatus.

The aforementioned modules may be omitted or replaced with other modules which perform similar/same operations according to the exemplary embodiments.

The aforementioned method according to the present disclosure may be implemented in software form, and the encoding apparatus and/or the decoding apparatus according to the present disclosure may be included in the apparatus which performs an image processing such as a TV, a computer, a smart phone, a set-top box, a display device, or the like.

In the aforementioned exemplary embodiments, while the methods are described based on the flowcharts shown as a series of steps or blocks, the present disclosure is not limited to the order of steps, and a certain step may occur in different order from or simultaneously with a step different from that described above. In addition, those skilled in the art will understand that the steps shown in the flowchart are not exclusive, and other steps may be included or one or more steps in the flowcharts may be deleted without affecting the scope of the present disclosure.

When the embodiments of the present disclosure are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may comprise an application-specific integrated circuit (ASIC), other chipsets, a logic circuit and/or a data processing device. The memory may include a ROM (read-only memory), a RAM (random access memory), a flash memory, a memory card, a storage medium, and/or other storage device.

What is claimed is:

1. A decoding apparatus for image decoding, the decoding apparatus comprising:
   a memory; and
   at least one processor connected to the memory, the at least one processor configured to:
   obtain information on quantized transform coefficients from a bitstream;
   derive quantized transform coefficients for a target block based on the information on the quantized transform coefficients;
   derive transform coefficients by performing dequantization for the quantized transform coefficients for the target block;
   derive residual samples for the target block based on performing an inverse transform for the transform coefficients by using an inverse transform matrix; and
   generate a reconstructed picture based on the residual samples for the target block and prediction samples for the target block,
   wherein based on a number of input elements of the inverse transform being R and a number of output elements of the inverse transform being N, a size of the inverse transform matrix is N×R, where each of N and R is a positive integer, and R is less than N, and
   wherein for the target block of which size is larger than 8×8, R is predetermined to be 16.

2. The decoding apparatus of claim 1,
   wherein R is equal to a number of the transform coefficients for which the inverse transform is to be performed.

3. An encoding apparatus for image encoding, the encoding apparatus comprising:
   a memory; and
   at least one processor connected to the memory, the at least one processor configured to:
   derive residual samples for a target block;
   derive transform coefficients for the target block based on performing a transform by using the residual samples and a transform matrix;
   derive quantized transform coefficients by performing quantization based on the transform coefficients for the target block;
   generate information on the quantized transform coefficients; and
   encode the information on the quantized transform coefficients to output a bitstream,
   wherein based on a number of output elements of the transform being R and a number of input elements of the transform being N, a size of the transform matrix is R×N, where each of N and R is a positive integer, and R is less than N, and
   wherein for the target block of which size is larger than 8×8, R is predetermined to be 16.

4. The encoding apparatus of claim 3,
   wherein R is equal to a number of the transform coefficients after which the transform is performed.

5. A non-transitory computer readable storage medium storing the bitstream generated by the encoding apparatus of claim 3.

6. An apparatus for transmitting data for an image, the apparatus comprising:
   at least one processor configured to obtain a bitstream for the image, wherein the bitstream is generated based on deriving residual samples for a target block, deriving transform coefficients for the target block based on performing a transform by using the residual samples and a transform matrix, deriving quantized transform coefficients by performing quantization based on the transform coefficients for the target block, generating information on the quantized transform coefficients, and encoding the information on the quantized transform coefficients; and
   a transmitter configured to transmit the data comprising the bitstream, wherein based on a number of output elements of the transform being R and a number of input elements of the transform being N, a size of the transform matrix is R×N, where each of N and R is a positive integer, and R is less than N, and wherein for the target block of which size is larger than 8×8, R is predetermined to be 16.

7. The apparatus of claim 6, wherein R is equal to a number of the transform coefficients after the transform is performed.

* * * * *